Figure 1:
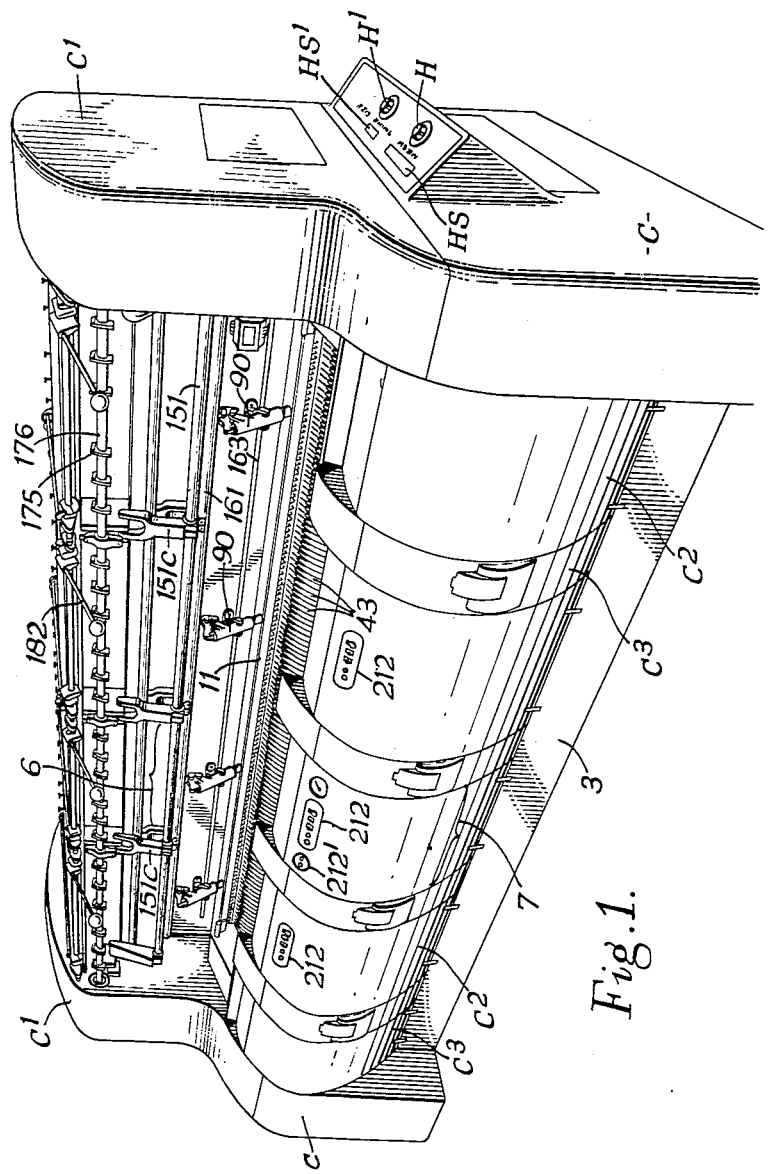

May 15, 1956   T. E. BOYNTON ET AL   2,745,309
NET MAKING MACHINES
Filed April 30, 1954   22 Sheets—Sheet 1

INVENTORS
Thomas E. Boynton
William Y. Turnbull
BY

ATTORNEY

May 15, 1956   T. E. BOYNTON ET AL   2,745,309
NET MAKING MACHINES
Filed April 30, 1954   22 Sheets-Sheet 2

INVENTORS
Thomas E. Boynton
William G. Turnbull
BY

ATTORNEY

May 15, 1956 T. E. BOYNTON ET AL 2,745,309
NET MAKING MACHINES
Filed April 30, 1954 22 Sheets-Sheet 5

May 15, 1956 T. E. BOYNTON ET AL 2,745,309
NET MAKING MACHINES
Filed April 30, 1954 22 Sheets-Sheet 6

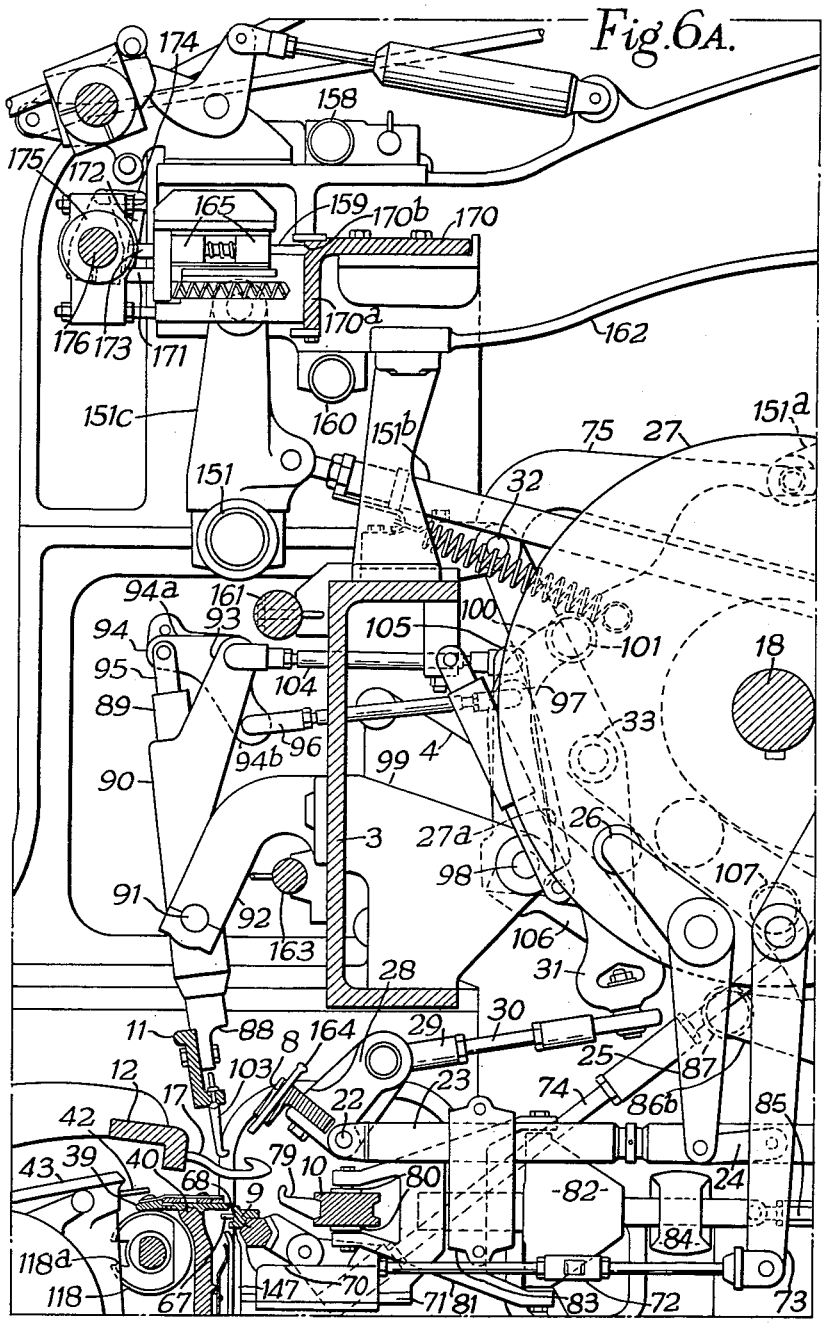

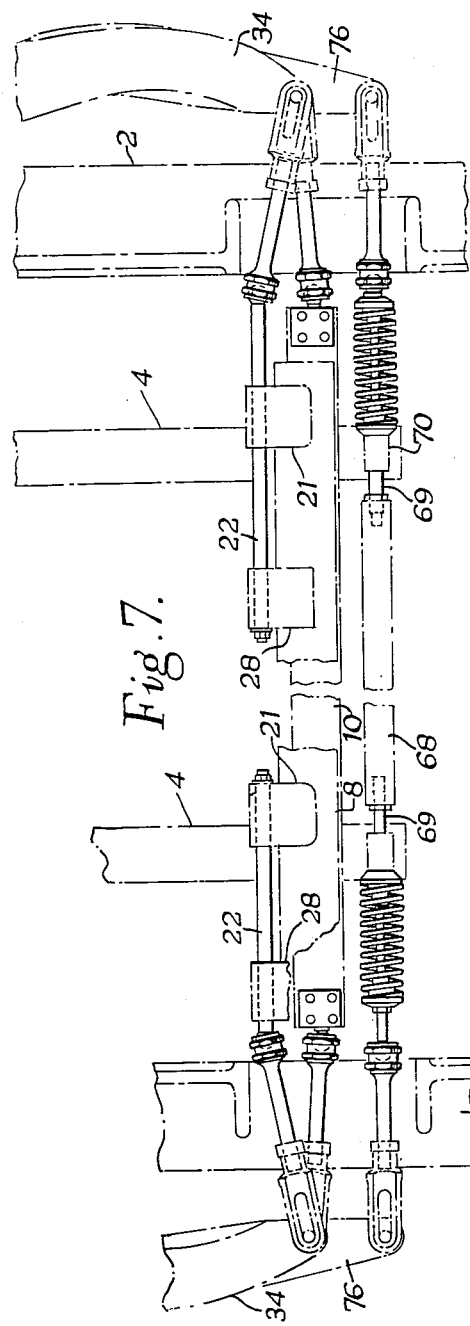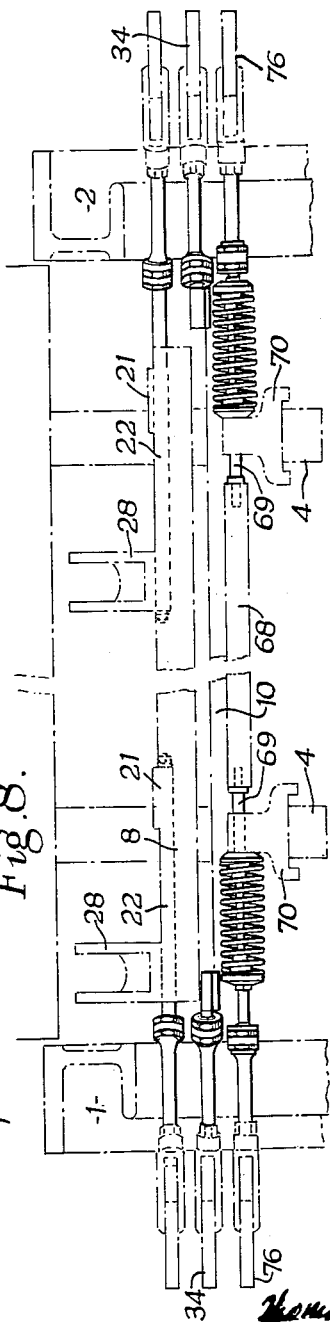

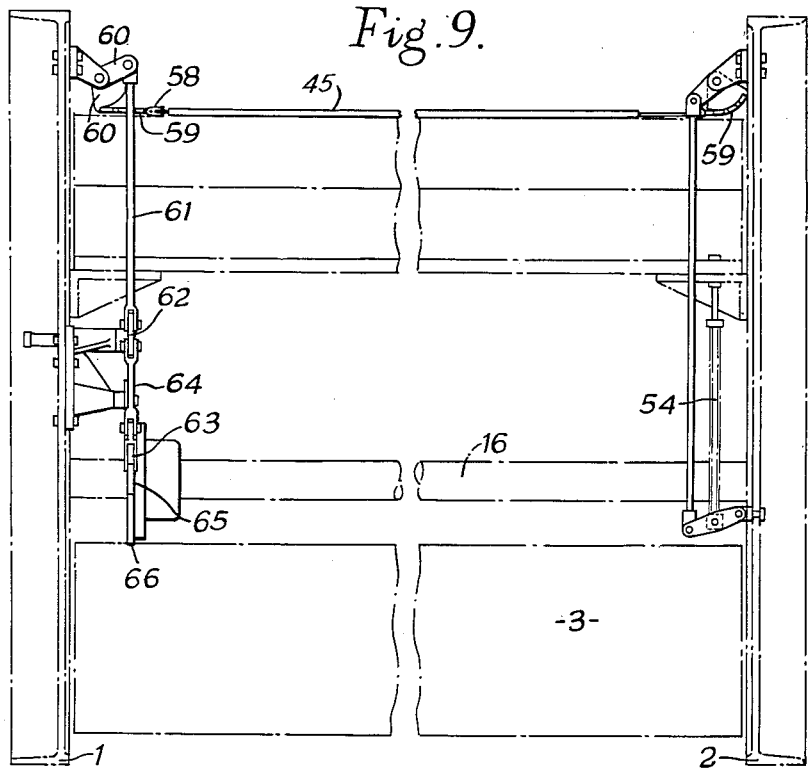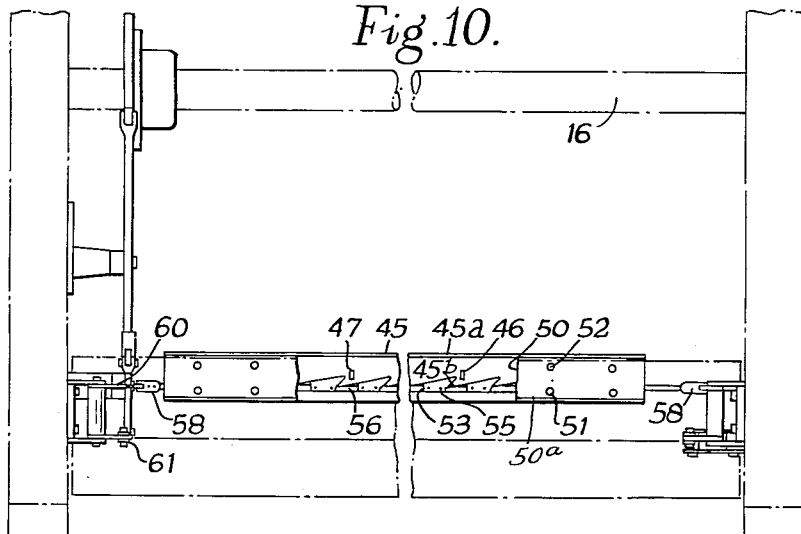

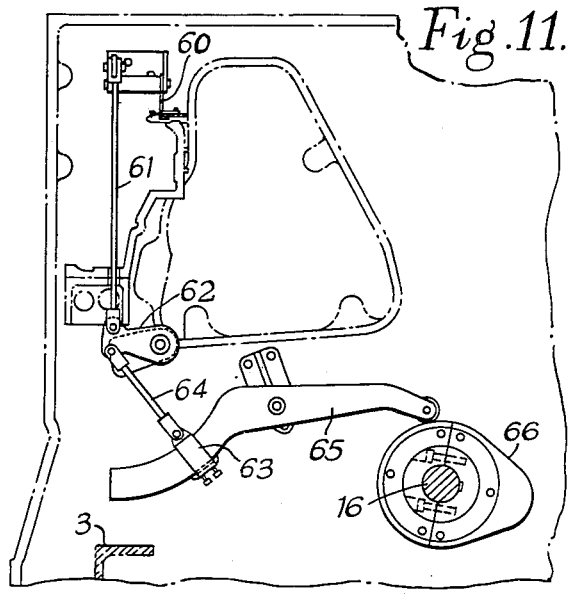
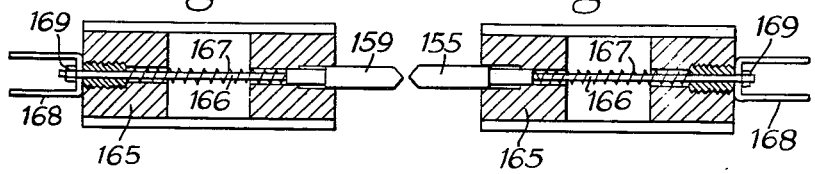
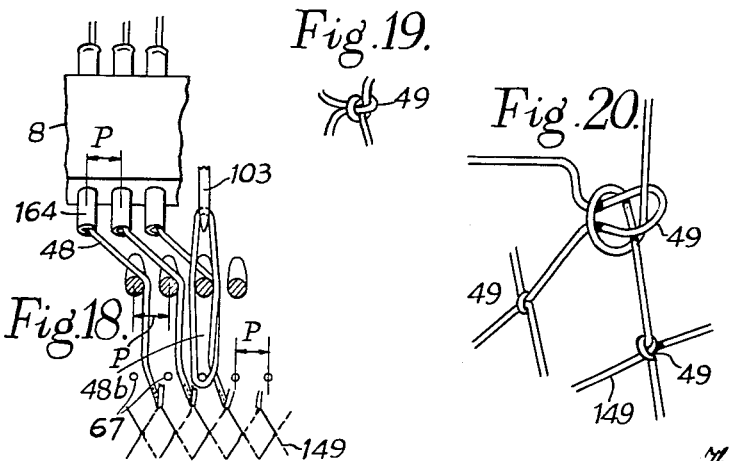

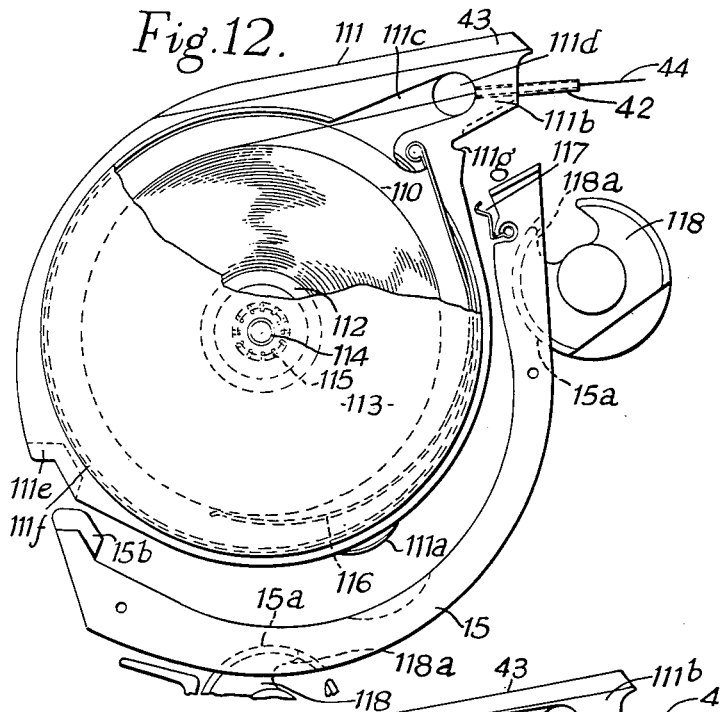
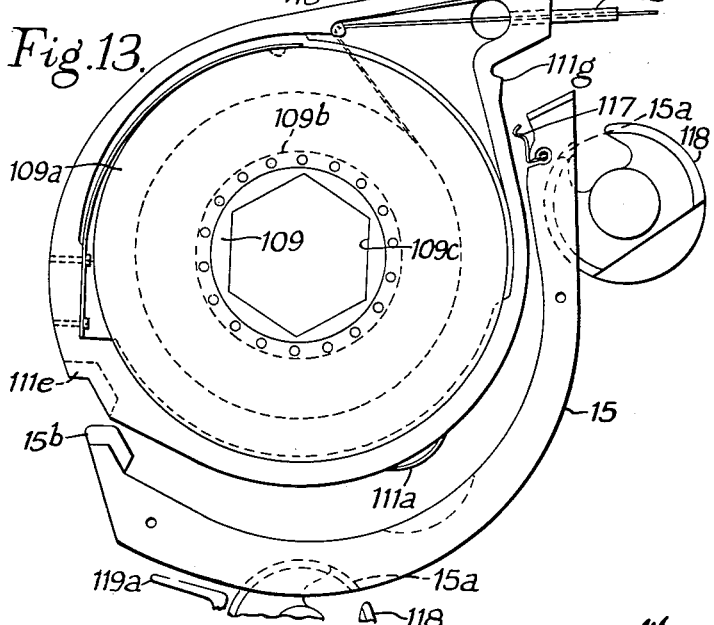

May 15, 1956  T. E. BOYNTON ET AL  2,745,309
NET MAKING MACHINES
Filed April 30, 1954  22 Sheets—Sheet 12
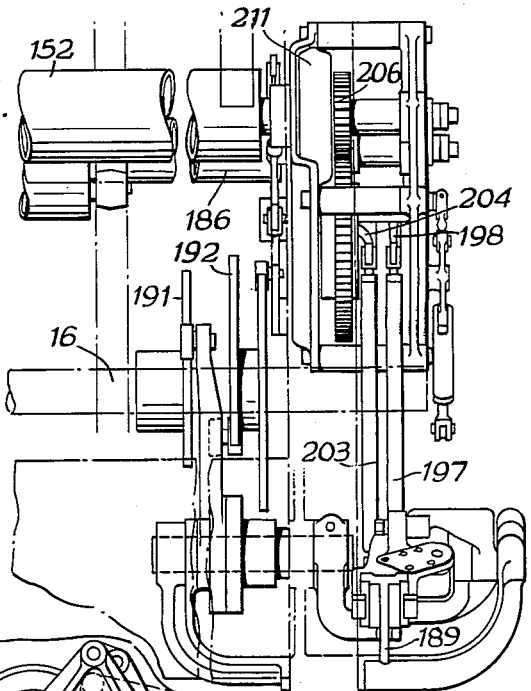
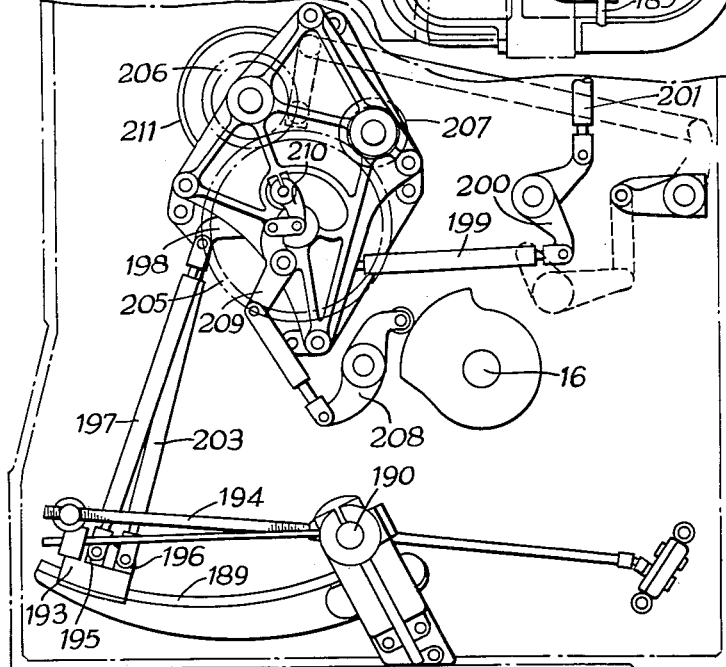
INVENTORS
Thomas E. Boynton
William H. Turnbull
BY
ATTORNEY

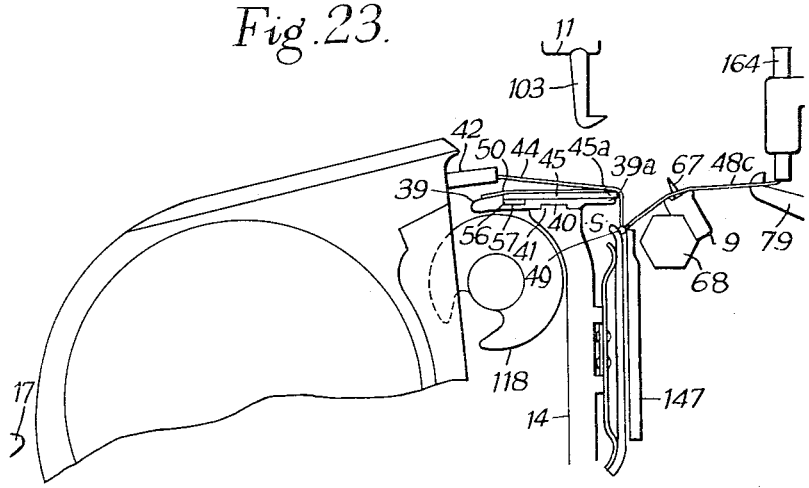
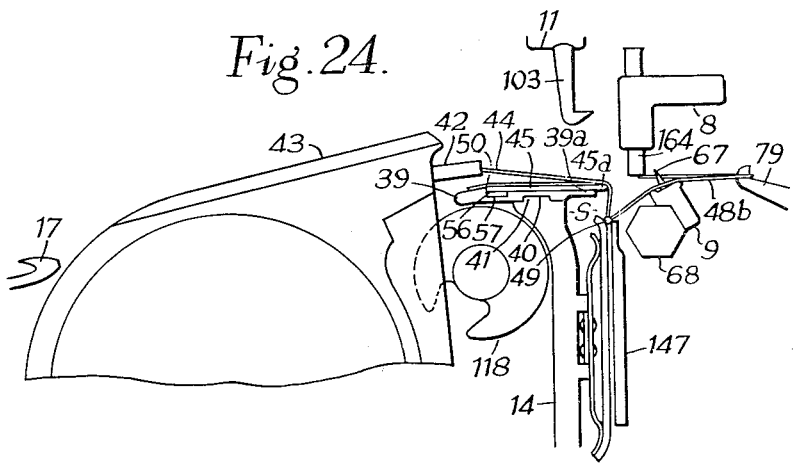

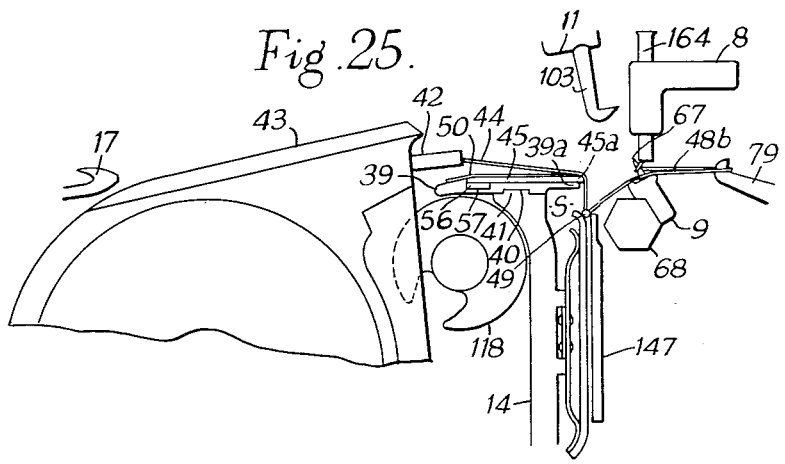
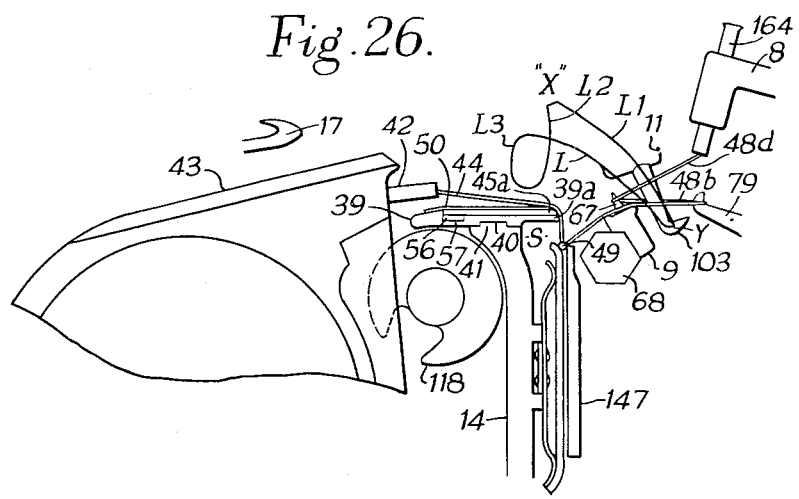

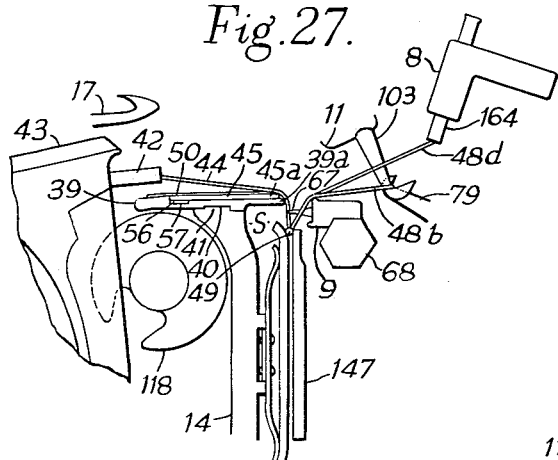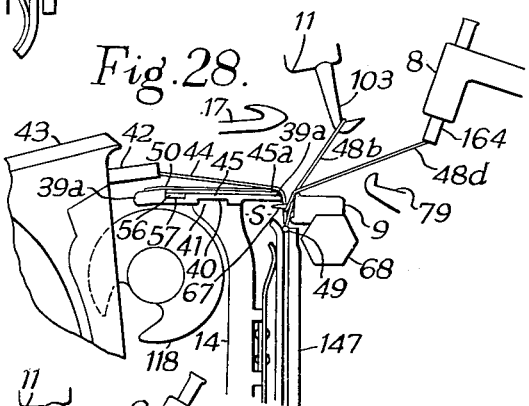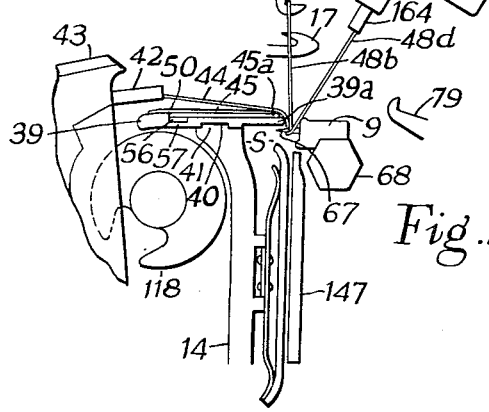

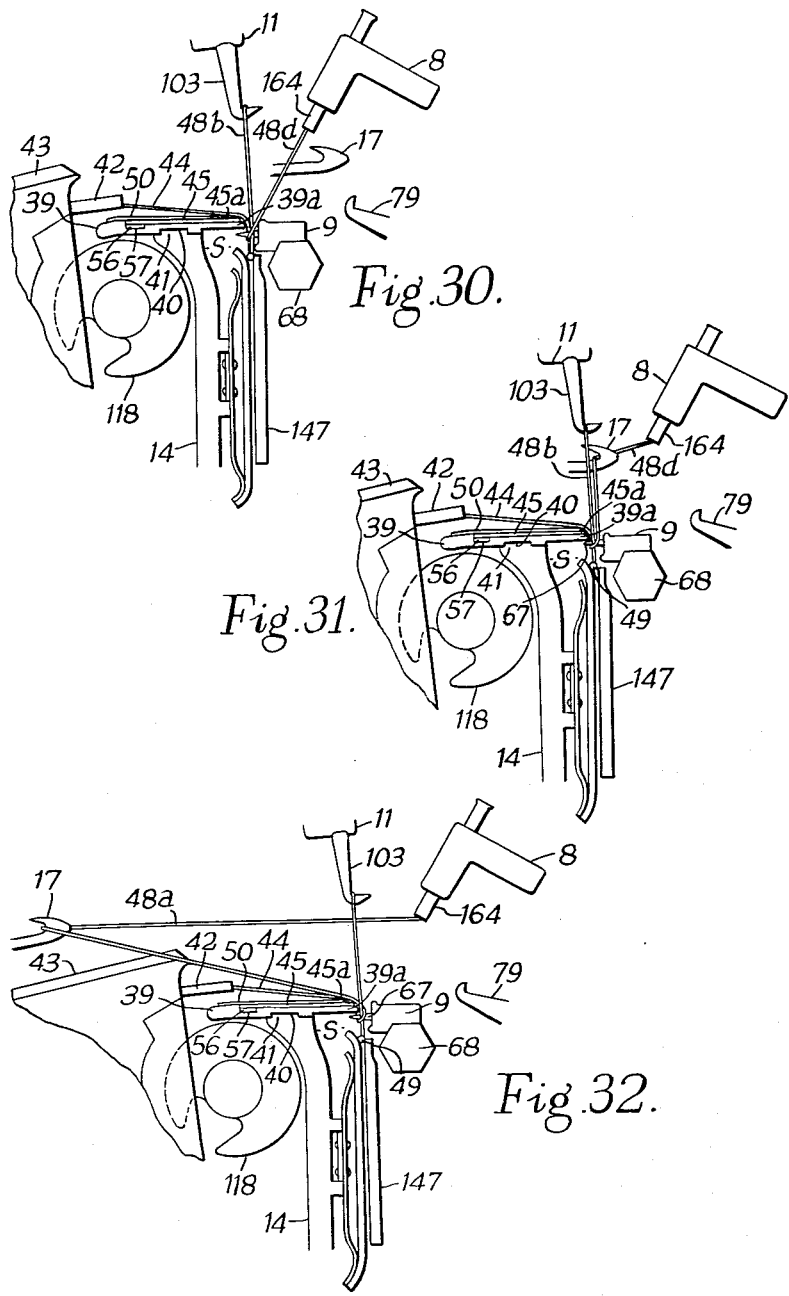

INVENTORS
Thomas E. Boynton
William G. Turnbull
BY

ATTORNEY

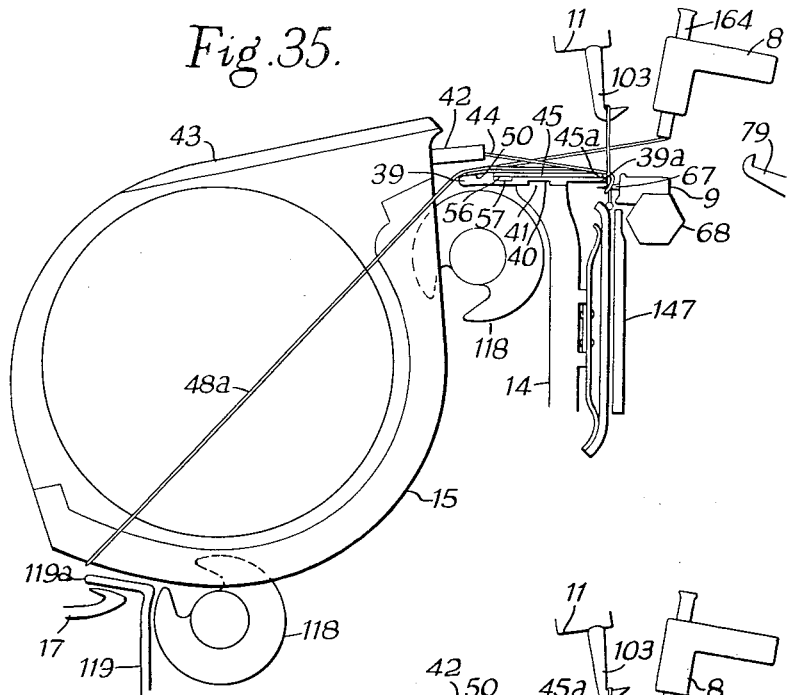
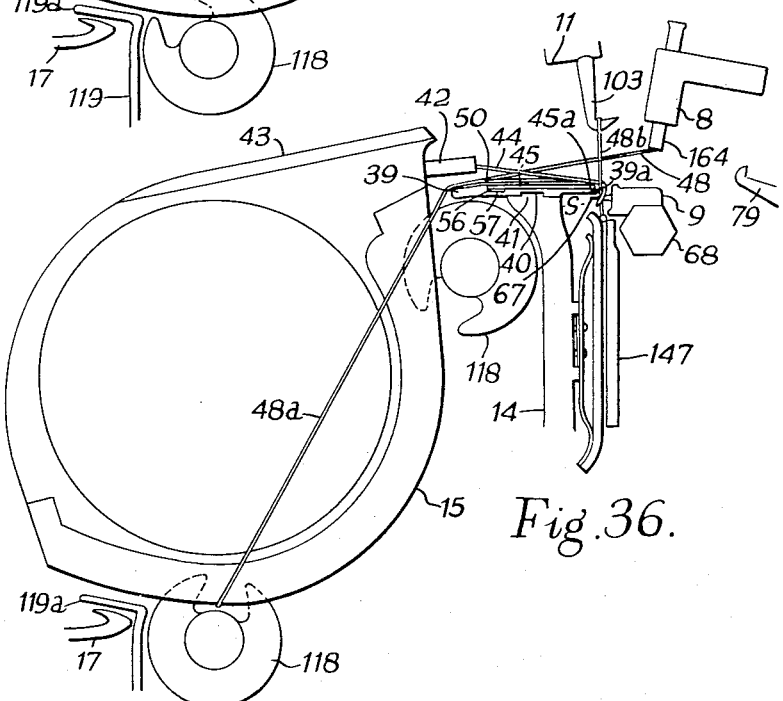

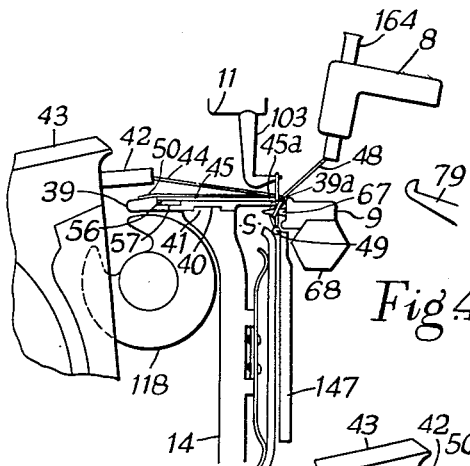
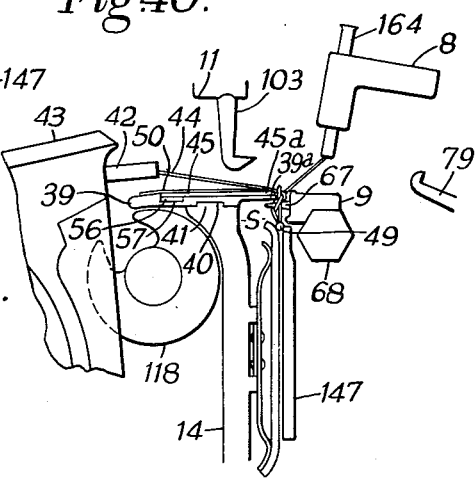
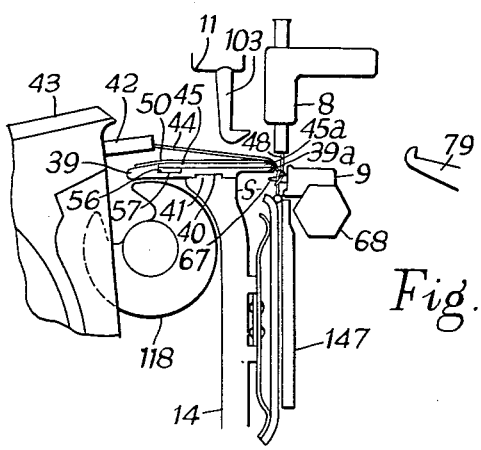

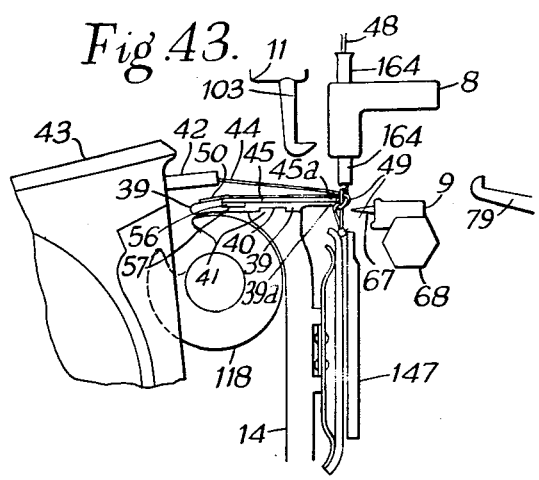
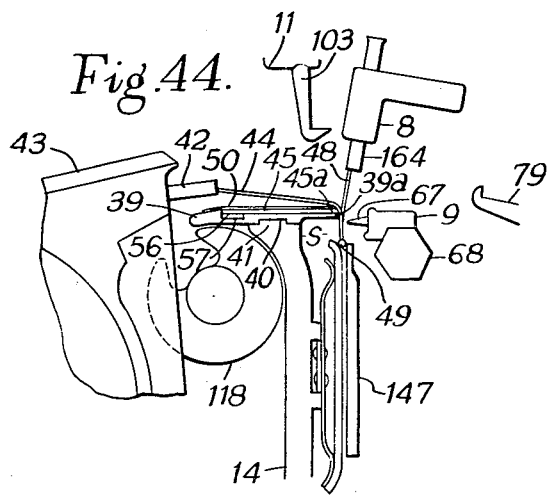

United States Patent Office

2,745,309
Patented May 15, 1956

2,745,309

NET-MAKING MACHINES

Thomas Edward Boynton, Leicester, and William Greenwell Turnbull, Kirby Muxloe, England, assignors to Porter, Spiers (Leicester) Limited, Leicester, England, a British company Application April 30, 1954, Serial No. 426,791

Claims priority, application Great Britain April 30, 1953

12 Claims. (Cl. 87—53)

This invention relates to machines for making netting composed of strands knotted together at intervals to form meshes, these strands consisting of yarns, threads or twines manufactured from any natural or synthetic fibre or mixture of fibres. Such strands, of which those of cotton, hemp, manila, sisal, nylon, or the like may be quoted as examples, will hereinafter for convenience be referred to as "twines." In the case of synthetic fibres the twines may be made from continuous filaments, or from the form known as staple fibre, or may, less commonly, be of the so-called monofil type.

Netting produced on a machine constructed in accordance with this invention may be employed for any appropriate purpose, including fish netting, sports netting and netting for any suitable commercial, industrial or decorative use.

The invention, moreover, is concerned with a power-operated net making machine of the general class including, in combination, a row of spools consisting of or containing wound packages of "spool twines," a structure, e. g. a creel stand, for supporting bobbins wound with further threads, conventionally known, and hereinafter for simplicity referred to, as "top twines," and knotting mechanism so constructed, arranged and operable as to be adapted to tie together and knot the spool and top twines in the formation of meshes of knotted netting. In netting of this character there are staggered rows of equally spaced knots, and the spool and top twines interengaged and tied together in each knot extend obliquely in opposite directions to two adjacent knots in the previously formed row such as to produce diamond or substantially diamond-shaped meshes.

The primary object of the present invention is to provide a power-operated net making machine of generally improved and robust construction designed not only to increase the speed of production, but also the quality including the evenness of the work, i. e. netting. In this connection a principal aim is the provision of a novel and more efficient form of knotting mechanism as will be hereinafter described.

A further object is to provide such a machine in which the twine capacity of the spools is substantially larger than in a conventional power-operated net making machine.

A still further object of the invention is to provide a power-operated net making machine wherein not only the speed thereof can be varied to compensate for different qualities of twines, but also the mesh of the netting being produced can be varied, while the machine is running.

Broadly considered, the net making machine constituting this invention is characterized by the provision therein of knotting mechanism including, in combination, means operable to form loops of the top twines, means for engaging, forming into bights and drawing through the said loops adjoining portions of the top twines, and means for thereafter drawing up the bights and effecting engagement thereof with the relevant spool twines such as to draw loops of the latter through the aforementioned loops of the top twines. These various means are operable conjointly and in suitable timed relation to produce simultaneously a row of knots.

The knotting mechanism may advantageously also include means for taking the loops formed from the top twines and moving them into such positions as to facilitate their penetration by the means employed to engage and form into bights the adjoining portions of the said twines.

For paying out lengths of the top twines to the means adapted to form the bights while these means are moving about the spools, as hereinbefore described, and then for thereafter drawing up the elongated bights into engagement with the spool twines, the machine may be equipped with a movable compensating bar or roller around which the top twines pass. In this instance means may be provided for moving this compensating bar or roller bodily to and fro in directions from and towards the knotting mechanism independently of primary draw off mechanism employed to draw the top twines off the bobbins.

In conjunction with the said (main) compensating bar or roller there may also be provided an auxiliary compensating bar or roller which is movable to compensate for any other requirements of the knotting mechanism and is also adjustable to cover for varying twine thicknesses. The auxiliary compensating bar or roller may also be used to effect tightening of the knots.

In a convenient embodiment of the invention, the improved knotting mechanism incorporated in the machine comprises, in combination, movable guides through which the top twines from the bobbins are drawn and from which these twines extend to the net, spools adapted to contain packages of twine and from which the spool twines are drawn, and a fixed guide plate or equivalent providing a support both for the portions of the spool twines extending from the spools to the net and for each succeeding row of knots during formation thereof. Also, two suitably spaced and relatively movable sets of elements about which the top twines can be drawn into loops as a consequence of back and forth movements of the guides conjointly with relative lateral movements between the said elements and the guides are provided and hooked members are operable not only to engage the said loops and to take them off the set of elements furthest away from the guide plate or equivalent but also to displace the loops into a more favourable plane than that in which they are initially formed. A second series of hooked members is operable first to penetrate the displaced loops and then to engage adjoining portions of the top twines, form the same into bights and draw the latter through the aforesaid loops and about the spools. Lastly, means is included for stripping the elongated bights from the second mentioned hooked members so that the bights can thereupon be drawn up into engagement with the portions of the spool twines supported by the guide plate or equivalent, for the purpose previously described.

To facilitate a clearer understanding of the following further description, the guides and the various elements and hooked members will be described in terms having reference not only to their specific form but also to their position in the preferred constructional form of the machine. While it is considered that only in this way will it be possible clearly to distinguish the various sets of cooperating parts, the terms now to be used are not necessarily intended to import limitations into the specification as, of course, the precise form and relative position of the said guides, elements and members may vary, according to circumstances and requirements.

In the first place, the guides for the top twines, although they may simply consist of wire eyes or the like, are preferably of tubular form and will accordingly be hereinafter referred to as "nozzles." These nozzles are secured in a bar at the "pitch" of the machine, by which latter term is meant the distance between the central plane of one spool and the next. In the preferred embodiment of the invention the nozzle bar, besides being capable of rising and falling, is movable back and forth and also laterally to the left and to the right alternately during the formation of successive rows of knots.

The spools in this embodiment are set in "shuttles," i. e. spool containers, secured at the desired pitch upon a beam at the front of the machine.

The two spaced sets of elements about which the top twines are drawn into loops may advantageously consist of rows of pins spaced at the pitch of the machine. The pins in one row, hereinafter termed the "front pins," may be fixed in a bar located behind the guide plate or equivalent, this front pin bar, besides being turnable about an axis and movable back and forth, is also shiftable laterally alternately to the left and to the right during the formation of successive rows of knots. The pins of the second row, to be known as the "rear pins," are located behind and parallel to the row of front pins and are set in a further pin bar which, while being movable back and forth and also laterally in a similar way to the front pin bar, is incapable of any turning movement.

The hooked members employed to take loops of the top twines off the rear pins and to dispose these loops in a plane more favourable for a knot tying operation are, in this particular embodiment, initially located and also entirely operable above the guide plate or equivalent and will for this reason be called the "top hooks."

As to the second mentioned hooked members, since these, after penetrating the appropriate loops, and forming and drawing through these loops bights of the adjoining portions of the top twines, are caused to move down below the guide plate or equivalent in curved paths conforming with the shaping of the fronts of the shuttles, they will hereinafter be referred to as the "bottom hooks."

Figure 2:
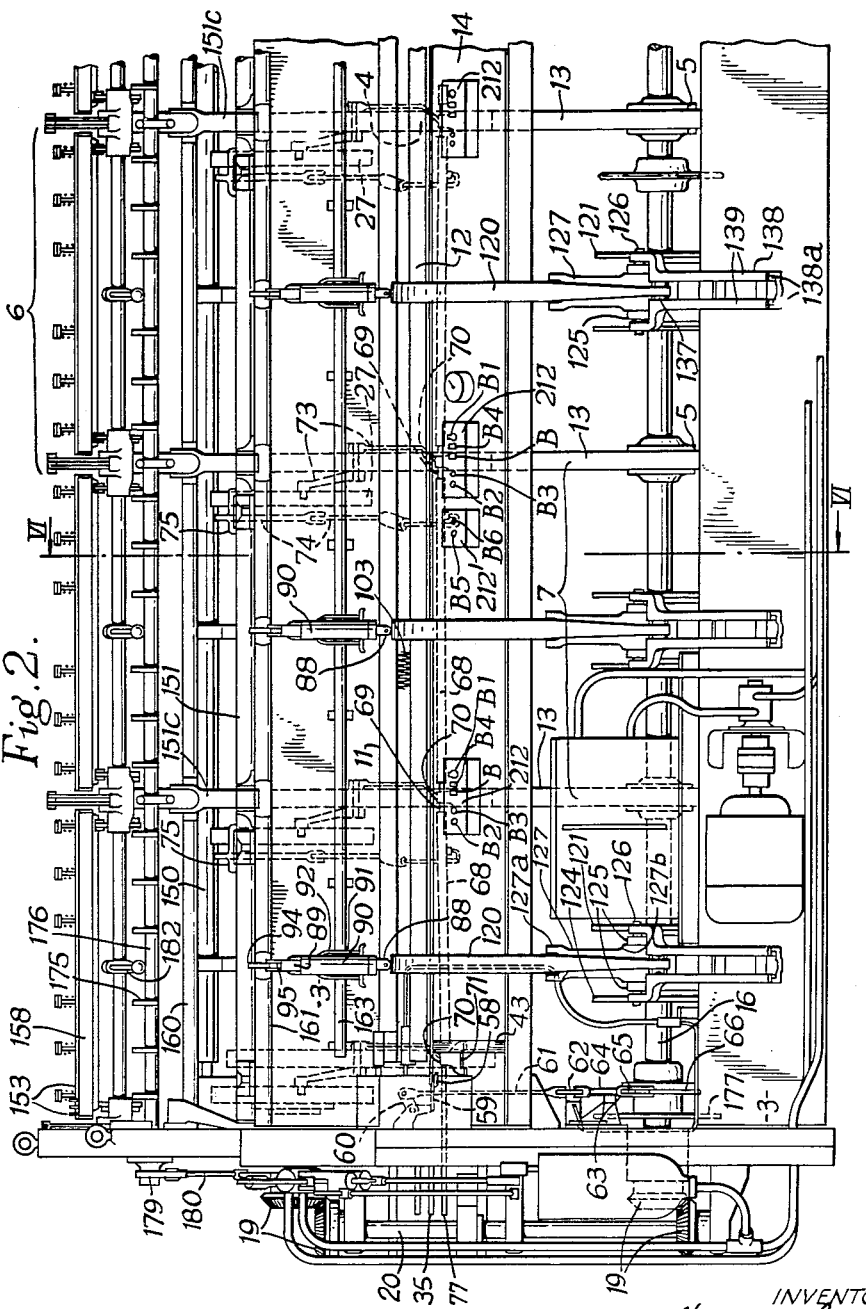
Figure 3:
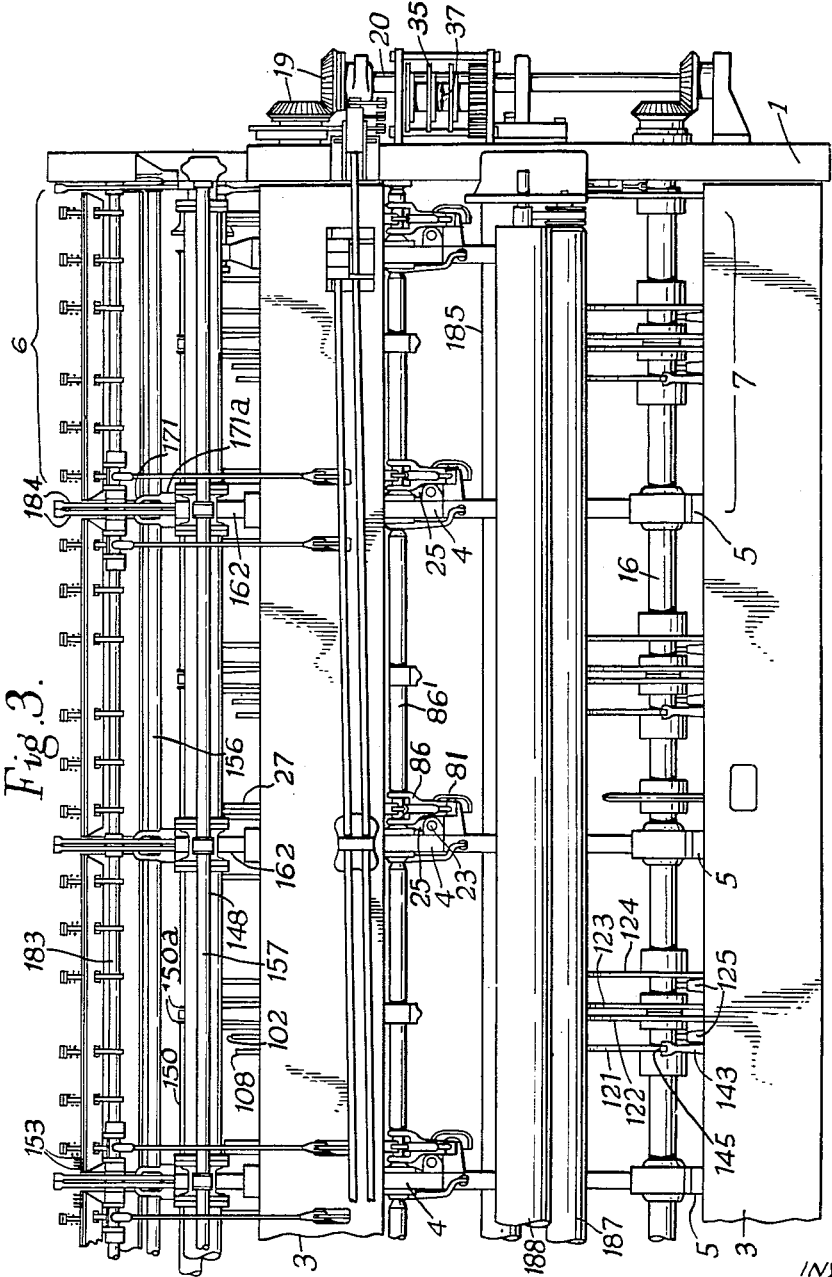
Figure 4:
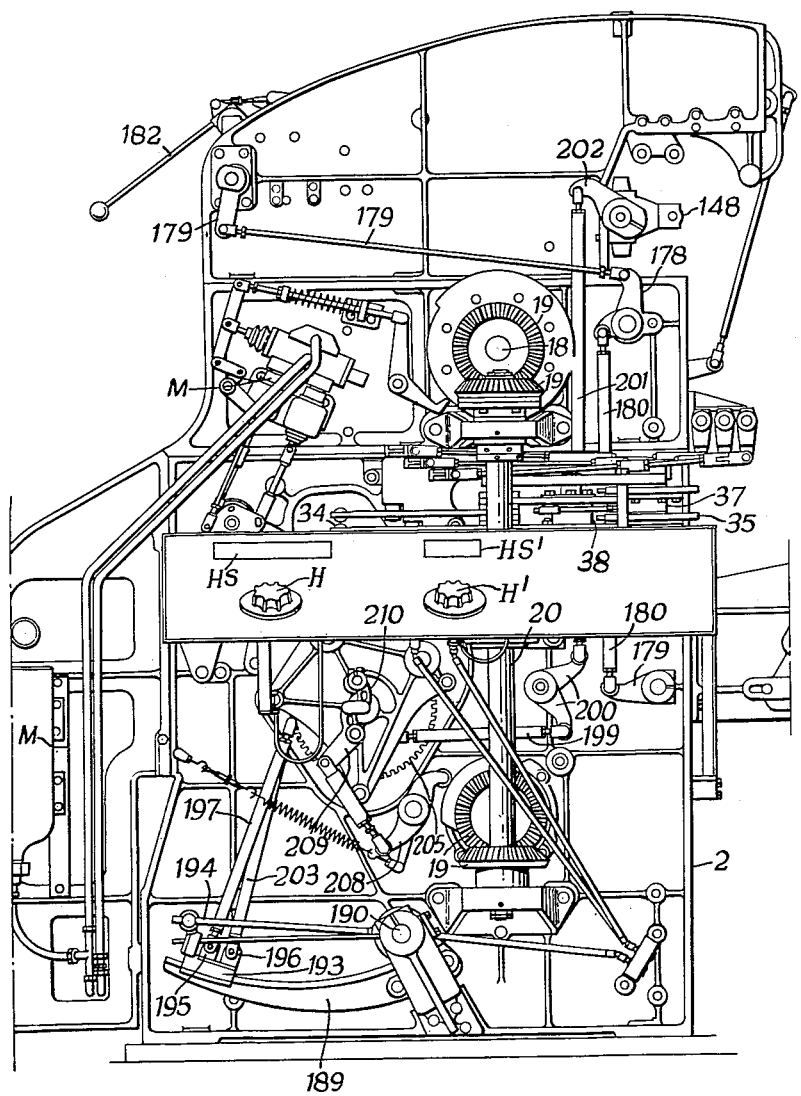
Figure 5:
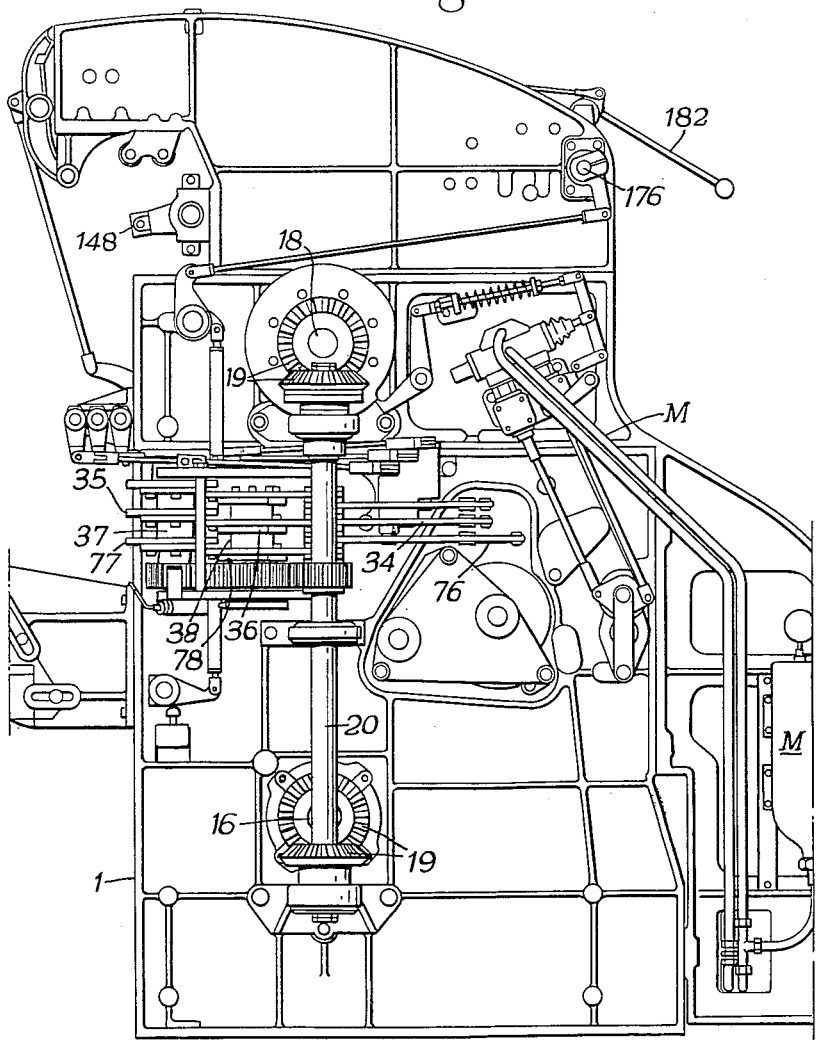
Figure 6:
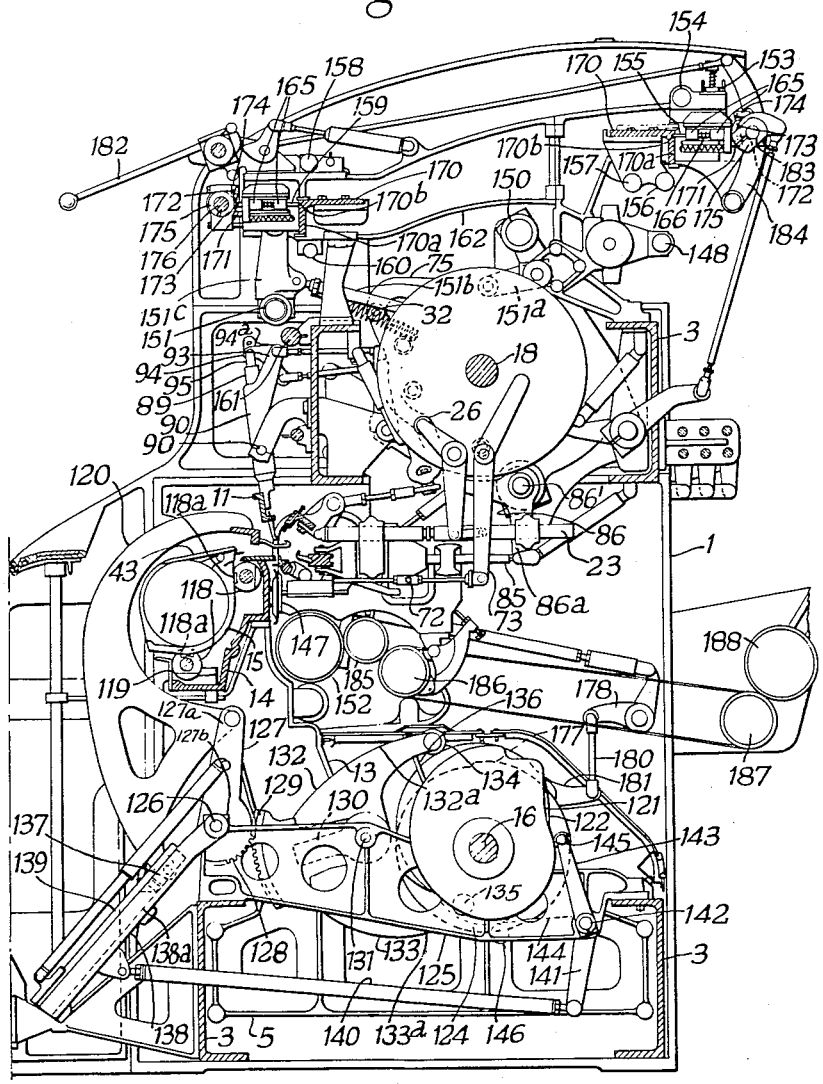

In order that the invention may be more clearly understood and readily carried into practical effect, a specific constructional form of the improved power-operated net making machine embodying the foregoing and other features of the invention will now be described, by way of example, with reference to the accompanying drawings, wherein, Figure 1 is a general perspective view of the said machine, Figure 2 is a front elevational view of the machine with the right-hand portion thereof omitted for convenience in illustration, Figure 3 is a rear view of so much of the machine as is shown in Figure 2, Figure 4 is a right-hand end view of the machine, Figure 5 is a left-hand view of the same, Figure 6 is a cross-sectional view taken on the line VI—VI of Figure 2, Figure 6A is an enlargement of an upper portion of Figure 6, Figure 7 is a detail plan view of the end movement connections to both the front and rear pin bars and also the nozzle bar, Figure 8 is a front view of these connections, Figures 9, 10 and 11 are detail front, plan and end views respectively of the spool twine draw-off mechanism, Figure 12 is an exploded side view comprising one of the shuttle holders and the corresponding shuttle (with a spool shown in position therein), Figure 13 is a similar view including a modified form of spool, Figures 14 and 15 are detail front and right-hand end views respectively of the net draw-off mechanism, Figure 16 is a detail cross-sectional view depicting one of the front trappers employed for action on the top twines in the manner and for the purpose hereinafter to be described, Figure 17 is a similar view of one of the rear trappers, Figure 18 is a diagrammatic front view of a fragmentary portion of the nozzle bar, and a few of the nozzles, front pins and bottom and top hooks shown in relation to netting being produced, Figure 19 shows one of the knots produced by the knotting mechanism, Figure 20 is a portion of the finished netting showing one of the knots in an untightened condition, and Figures 21–44 constitute a series of diagrams illustrating a complete cycle of operation of the machine.

Like parts are designated by similar reference characters throughout the drawings.

*Framing*

In the illustrated example, the main framing of the machine comprises two suitably spaced vertical side or end frames 1 and 2 connected, both at their lower ends and at or near their upper ends, by two (i. e. front and rear) parallel channels or beams 3 which extend right across the machine and are in turn connected and braced together by top and bottom series of parallel intermediate or cross frames 4 and 5 (Figures 2, 3 and 6). These intermediate or cross frames extend in the fore and aft direction, parallel with the two side or end frames, and are equally spaced apart at intervals of, say, 36" or any other convenient and prescribed distance. The main framing can therefore be regarded as comprising vertically spaced bottom and top sections which are so designed that the space between facilitates the withdrawal of completed netting from the machine. Moreover, the division of the framing by the spaced intermediate or cross frames 4 and 5 into what for all intents and purposes are separate compartments such as 6 and 7 (Figures 2 and 3) enables the various mechanisms employed to operate, and control the movements of, the nozzle bar 8, the front and rear pin bars 9 and 10 and the top and bottom hook bars 11 and 12 to be correspondingly divided into connected units such as to provide a particularly robust and scientifically stiffened machine capable of producing more even and hence better quality netting than heretofore. Bolted to the front of the bottom section of the framing, at the stated intervals apart, are upwardly directed brackets 13 adapted, as depicted in Figure 6, to support a horizontal beam 14 carrying a straight series of shuttle holders 15, the regular spacing of which determines the pitch of the machine. In this section of the framing is mounted a bottom rotary cam shaft 16 and also the mechanism for actuating the bottom hooks 17. In the top section of the framing, on the other hand, is mounted a top rotary cam shaft 18 and the various cam-actuated and cam-controlled connections to the nozzle bar 8, the front and rear pin bars 9 and 10 and the top hook bar 11. The bottom cam shaft 16 constitutes the main continuously driven shaft of the machine, and from this the top cam shaft 18 derives continuous motion through the medium of any suitable gearing such, for instance, as bevel gears 19 and vertical shafts 20 provided at both sides or ends of the machine (see Figures 2–5).

*Nozzle bar operating mechanism*

In the specific example now being described, the back of the nozzle bar 8 is fitted at intervals of the aforementioned prescribed distance with U-shaped brackets 21 (Figure 7) which, through the medium of hinge pins 22 fixed therein, are pivotally connected with the leading ends of horizontally disposed tubular slides 23. Each such slide is movable back and forth in suitable timed relation with the various parts of the knotting mechanism for which purpose it is connected, as illustrated in Figures 6 and 6A, by means of a pivoted link 24, with a bell-crank lever 25 furnished with a roller 26 engaged in an appropriately contoured groove 27a cut in a face cam 27 secured upon the top cam shaft 18. Spaced laterally apart from each U-shaped bracket 21, and connected therewith by the corresponding hinge pin 22, is a bifurcated upwardly extending bracket 28. Each of the last mentioned brackets has a universal connection 29 with the forward end of an adjustable link 30 the rear end of which is suitably articulated to a lever 31 fulcrumed at 32 at the top of the machine and furnished with a cam follower 33 arranged to work in another groove cut in the same face cam 27, serving to effect and control the movements of the corresponding tubular slide 23. For moving the nozzle bar 8 endwise in opposite directions, i. e. laterally, to the right or left according to knotting requirements, each end of the said bar is connected to a fulcrumed lever 34. (Figures 5, 7 and 8) adapted to be oscillated by cams 35 and 36 suitably pre-arranged on cam drums 37 and 38 rigidly secured upon shafts (not shown) and geared to the vertical shafts 20 connecting the bottom and top cam shafts 16 and 18.

Guide plate

A guide plate 39 extends the full width of the machine and is of an extruded section having on the underside thereof a longitudinal groove 40 enabling the said plate to be engaged with a complementarily formed rib 41 on a part of or on the horizontal beam 14 carrying the shuttle holders 15. The top surface of the guide plate 39 is smooth. The front marginal portion of this plate is located immediately beneath a series of tubes 42 which are fitted in the shuttles 43 and through which the spool twines 44 are drawn (as hereinafter more fully described). As shown more clearly in Figures 21–44, the rear marginal edge portion 39a of the guide plate 39 projects rearwardly from the part upon which the plate is fitted so that there is a clear space S beneath and adjoining the said edges.

Spool twine draw-off mechanism

On the top of the guide plate 39 there is provided, also as shown in the last mentioned figures and Figure 10, a spool twine draw-off bar 45 which extends substantially the full length of the machine. This bar 45, made in sections which are integrally united, is transversely slotted at intervals; and, projecting up into each slot 46 (Figure 10) is a square-shaped guide block 47 secured upon the top of the guide plate 39. The operative, i. e. rear, edge 45a of the spool twine draw-off bar 45 is bevelled somewhat and, by sliding the bar bodily forwards over the plate, the said edge is projected over and in front of the corresponding edge 39a of the guide plate 39 for the purpose of contacting and drawing off the spool twines 44 to an extent sufficient to enable the bights 48a of the top twines 48 (Figures 32–35) to draw the spool twines 44 through the loops 48b during the formation of knots 49 (Figures 19, 20 and 43) as previously mentioned. A cover plate 50 extends over the draw-off bar 45, the front edge 50a of this plate being secured to the forwardly projecting portion of the guide plate 39 by means of screws 51 (see Figure 10). Further screws 52, extending down into the guide plate 39 through the square-shaped guide blocks 47 serve to hold the cover 50 in position. The front edge of the spool twine draw-off bar 45 is formed with teeth 45b designed to provide a series of obliquely disposed surfaces for co-operation with a corresponding series of relatively movable wedge-shaped cams 53 (Figure 10) whereby the draw-off bar 45 is projected for action on the spool twines 44 and permitted to return to its inoperative position under the control of a spring 54 (Figure 9) at required times. The wedge-shaped cams 53 are attached by screws 55 to the upper surface of an operating bar 56 which is longitudinally slidable within a recess 57 (Figures 21–44) formed in the guide plate 39 from end to end thereof. To the opposite ends of the operating bar 56 are rivetted forked attachments 58 wherein are anchored the appropriate ends of chains 59 the opposite ends of which are secured to cam-operated and spring-influenced connections of any suitable character. Thus, for example and as depicted in Figures 9 and 11, the left-hand end of the operating bar 56 (as viewed from the front of the machine) may be connected, through the medium of a short length of chain 59 with a bell-crank 60 which is in turn connected by way of a connecting rod 61 to a further bell-crank 62 connected to a cross head 63 by means of a further rod 64. The cross head 63 is adapted to be actuated by a cam 66 on the bottom cam shaft 16. The right hand end of the operating bar 56 is associated with connections including the aforesaid spring 54.

Front pin bar and its operation

With regard to the front pin bar 9, this is co-extensive with the nozzle bar 8 and is furnished with pins 67 set at the pitch of the machine. As illustrated in Figures 2 and 6, the front pin bar 9 is attached to a plurality of suitably spaced carrier members 68 which are in turn rigidly secured upon pivot shafts 69 which are mounted in bearing blocks 70 slidable back and forth on guides 71 mounted on the spaced intermediate or cross frames 4 of the top section of the framing. The blocks 70, which are spaced apart at the aforementioned prescribed intervals, are adapted to be moved back and forth, at appropriate times during a knotting cycle, by grooves in the cams 27 on the top cam shaft 18 (see Figures 3 and 6) through the medium of linkages 72, 73 of any suitable character. For turning the shaft 69 within the bearing blocks 70 and thereby correspondingly turning the front pin bar 9 up or down, according to knotting requirements, the carrier members 68 for the bar are connected to further linkages 74, 75 arranged to be influenced by still additional tracks on the cams 27. The front pin bar 9 is adapted to be moved laterally to the right or left, as required, in a similar manner to the nozzle bar 8. Thus, each end of the front pin bar 9 is connected to a lever 76 (Figure 5) arranged to be oscillated by cams 77 and 78 on cam drums 37 and 38 aforesaid.

Rear pin bar and its operation

The rear pins 79, fashioned after the manner of hooks, are set at the pitch of the machine in the horizontally disposed rear pin bar 10 which, in this particular example, is provided, on the top and bottom sides thereof and at the prescribed intervals apart, with pairs of axially aligned and oppositely directed trunnions 80 whereby the said bar is mounted between the spaced limbs of forked or bifurcated links 81 (Figure 3); serving to connect the bar 10 with cross-heads 82. These links 81, as depicted in Figure 6, are pivotally connected to the leading ends of the cross-heads 82 in such a way as to enable the links to be turned aside in either direction about vertical axes. The cross-heads 82 are slidable back and forth horizontally in fixed bearings 83 and 84 associated with the spaced intermediate or cross frames 4. Each such cross-head 82, moreover, is connected, by means of a connecting rod 85 or the like, with a depending arm 86a of a suitably fulcrumed bell crank lever 86 (Figure 3) the other arm 86b of which is furnished with a roller 87 arranged in contact with the appropriately profiled edge of the cam 27. Here again, the required lateral movements of the rear pin bar 10 may conveniently be effected in much the same way as the endwise movements of each of the nozzle and front pin bars. The construction and arrangement are, of course, such that whenever the rear pin bar 10 is displaced laterally either to the left or to the right the forked or bifurcated links 81 are turned aside—the parallelism of the front and rear pin bars being in this event maintained by the capability of the links to turn relatively to the rear pin bar.

Top hook bar and its operation

Turning now to the top hook bar 11, this is of angular cross-section and, as shown in Figures 2 and 6, is bolted at each of the aforementioned prescribed intervals to a lug depending from a plug-like component 88 rigidly secured in the lower end of an upwardly extending tubular push rod 89 of circular cross-section. Each of these push rods is slidable telescopically within a tubular guide lever 90 which, intermediate its ends, is provided with trunnions 91 mounted to turn in bearings formed in parallel spaced limbs of a forked bracket 92 bolted to the front channel or beam 3 of the top section of the machine framing. At its upper end the fulcrumed tubular guide lever 90 is formed integrally with a pair of rearwardly inclined spaced lugs 93 between which is pivotally mounted a bell crank 94 having forwardly and rearwardly extending arms 94a and 94b. To the forwardly extending arm 94a of this bell crank is suitably articulated the upper end of an operating rod 95 the lower end of which latter is mounted to turn about a transverse gudgeon or similar pin fixed in a piston-like component (not shown) in turn rigidly secured within the tubular push rod 89 near the upper end thereof. The rearwardly extending arm 94b of the bell crank 94 is pivotally connected to the leading end of an adjustable link 96 whose rear end is similarly connected to the upper end of an arm 97 mounted to turn upon a short shaft 98 fixed at its ends in the laterally spaced sides of a bracket 99 bolted within the front channel or beam 3 of the framing. The bracket 99 may conveniently be bolted in position by the same bolts employed to secure the forked bracket 92 in which the tubular guide lever 90 is fulcrumed. In any event, the arm 97 connected with the bell crank 94 is either made in one piece with, or is attached to, a lever 100 furnished with a cam follower 101 arranged in contact with a further cam 102 secured upon the top cam shaft 18. By reason of this construction, actuation of the levers 97 and 100 by the said cams results in the bell cranks 94 being turned to move the tubular push rods 89 up and down within the tubular guide levers 90, through the medium of the operating rods 95. In this way, the top hook bar 11 is moved up and down correspondingly at appropriate times and to the required extent. To impart to the top hooks 103 the necessary compound movements, however, it is necessary also to cause the companion tubular guide levers 90 to swivel in their forked brackets 92, under cam control. For this purpose, the rearwardly inclined spaced lugs 93 formed at the upper end of each tubular guide lever 90 are connected to the leading end of a further adjustable link 104 the rear end of which is connected to the upper end of another arm 105 mounted to turn on the corresponding fixed shaft 98. Rigid with this second arm 105 (which is movable independently of the other arm 97 on the shaft) is a second lever 106 furnished with a cam follower 107 arranged in contact with a cam 108 arranged side by side with, and bolted to, the cam 102 controlling the relevant tubular push rod 89. The cam contours and the relative timing of the parts is such that during the formation of a row of knots, each top hook 103 (which moves in a single vertical plane coincident with the central plane of the corresponding spool 109) moves first downwardly and rearwardly in a curved line L, then straight back for a comparatively small distance, upwards again and forwards in a curved line L¹ to a point X on a level with but spaced rearwardly somewhat from its starting position, then in a substantially straight line L² downwards to a less extent than its first descent, next substantially straight forwards, and finally straight upwards in a rearwardly inclined line L³ to its original starting position, all as shown in Figure 26. It is to be clearly understood that when the top hooks 103 are stated to move rearwardly (that is to say, in a direction towards the back of the machine), they are, in fact, advanced, whereas retraction of the said hooks is effected when they are moved forwardly—towards the front of the machine.

Shuttles, shuttle holders and spools

Before proceeding to describe the mechanism for operating the bottom hooks 17 it will be convenient first to describe the shuttles 43 containing the spools 109 and the shuttle holders 15 since it is around the spools that the elongated bights 48a of the top twines 48 are drawn by the bottom hooks, and the shuttle holders which serve to guide the bights subsequent to their release from the bottom hooks and while they are being pulled up into engagement with the spool twines 44.

Referring to Figure 12, it will be seen that each of the shuttles 43 is, generally speaking, of flat form and is hollow to accommodate a correspondingly flat and suitably wound circular package 110 of twine. The shuttle comprises, on the one hand, a peripherally flanged side plate 111 forming a shallow container of substantial capacity provided with a central hollow hub or annulus 112 for the support of the wound package of twine 110 and about which such package can turn as and when the twine is drawn from the shuttle 43 and, on the other hand, a circular side plate 113 which constitutes a removable cover for the container and is adapted to be snapped into position under spring influence. The flanged side plate (container) 111 has a curved upper side and a substantially semi-circular underside or belly from which projects a small relatively thin fin 111a of convex form. Protruding from the back of the container at the top thereof (regarding the spool in its vertical position of use) is a nose-like formation 111b the underside of which has a straight but grooved edge. In this nose-like formation is provided a passage 111c communicating at its inner end with the hollow interior of the container 111 and at its outer end with a tube 42 fixed in the said formation. It is these tubes 42 which project rearwardly from the shuttles 43 immediately above the front portion of the guide plate 39. Adjoining the front end of the passage 111c in the nose-like formation is a hole 111d which is formed right through the container. The leading end of a spool twine 44 from a package 110 in the container can readily be drawn through the tube 42, when initially threading up, by the aid of an appropriately hooked tool. In the front of the container near the bottom thereof, that is to say at the juncture between the aforementioned curved upper side and the substantially semi-circular underside or belly, is an angularly shaped recess 111e to receive a corresponding protrusion 15b on the shuttle holder 15. The removable cover 113 for the container 111 is fitted centrally with a circular button 114 or the like which carries an encircling spring 115 snapped into the opening within the central hollow hub or annulus 112 of the container for the purpose of retaining the cover in position. The rim of the cover 113 is adapted, when the latter is snapped into position, to engage in an annular groove 111f formed in the side of the flange of the container. Within the container is also fitted a curved blade spring 116 the inner, i. e. free, end of which is arranged to bear upon the wound package 110 of twine to exercise a measure of control thereon as it turns about the hollow hub or annulus 112. As will be appreciated, the two hereinbefore described laterally spaced and parallel side plates, with the central hub or annulus interposed between them, provides an article which is readily recognisable as a non-rotary spool. In the commonly adopted nomenclature of those persons concerned with the manufacture, sale and use of power-operated net-making machines, these articles correspond to the "shuttles" with which such a machine is equipped, although the term "spools" is preferred as, during the formation of knots, the articles are not moved shuttle-wise but are maintained stationary throughout. Each shuttle holder 15, in this example, consists simply of a substantially semi-circular cradle-like component cast in one piece and of a thickness corresponding to that of the shuttle 43 it supports. The substantially semi-circular underside or belly of the shuttle fits snugly into the correspondingly concave upper surface of the cradle-like holder 15. For locating the shuttle in position in its holder, the latter is formed at its ends and at a suitable location intermediate these ends with formations which complement and are interengageable with the grooved underside of the nose-like formation 111b at the rear of the shuttle, the angularly-shaped and grooved recess 111e at the front of the shuttle and the thin convex fin 111a protruding from the underside or belly of the said shuttle respectively. Moreover, at its upper rear end each holder 15 is fitted with a retaining spring 117 adapted, when the corresponding shuttle is placed in position, to snap into engagement with a V-shaped projection 111g on the shuttle.

Each shuttle holder 15 is itself located and anchored in position, on the shuttle beam 14 at the front of the machine, by means of two suitably spaced circular anchor plates 118 (Figures 21 and 33–37) which are engaged in concave slots 15a cut in the underside of the holder. The curved bottoms of these slots are extended laterally to receive complementary formations on the appropriate sides of the anchor plates 118, the arrangement being such that upon interengagement of these formations in the slot extensions the holders will be locked in position whereas upon the anchor plates being turned to an appropriate extent to effect withdrawal of the said formations from the slot extensions the holders will be released for removal from the shuttle beam 14. Each of the anchor plates has a suitably notched periphery 118a and is adapted to be oscillated, from the top cam shaft 13 through intermediate connections and in suitable timed relation with the co-operating elements of the knotting mechanism, such as to permit the free passage of a bight 48a of the relevant top twine 48 around the smoothly curved underside of the shuttle holder 15 when the bight is being pulled up to engage the corresponding spool twine 44.

Instead of the shuttle being provided with a circular side plate such as 113 of a diameter sufficient to cover the container, this plate may alternatively be so reduced in size as merely to constitute a retainer for a removable metal spool housed within the container. In this modification the spool itself would consist of two flat or substantially flat discs suitably spaced apart by a central hub about which twine can be wound, in which instance this hub would rotate about the annulus 112 aforesaid.

The further alternative form of shuttle illustrated in Figure 13, has no side plates and is accordingly of hollow ring form for accommodation of a rotary spool 109 comprising a pair of circular plates such as 109a with a hub 109b between them. As will be seen, this particular spool has formed centrally therein a hexagonal aperture 109c to enable the spool to be placed on a correspondingly shaped spindle of a winding machine.

It is possible, and may in certain circumstances be advantageous, to employ in the improved machine packages of twine wound upon central cores of narrow width, the twine being so treated during winding as to make the packages self-supporting. For instance, the spool twine may be treated, during winding, with a composition of, say paraffin wax and a plastic material which serves to solidify the twine and cause the successively wound convolutions thereof to adhere firmly together. Solid packages of this form may themselves constitute the spools.

*Stripping bights of top twines from the bottom hooks*

For stripping elongated bights 48a of the top twines 48 from the bottom hooks 17 there is provided, in this example, an angle bar 119 which is fixed in front of the front anchor plates 118, immediately beneath the leading ends of the shuttle holder 15. This stripper bar 119 is disposed with one of its flanges or sides projecting forwards horizontally.

*Operation of bottom hooks*

By the mechanism now to be described, with reference to Figures 2, 3 and 6, the bottom hook bar 12 is operable to effect the required movements of the bottom hooks 17 first rearwardly from their inoperative positions to penetrate formed and displaced loops 48b of the top twines 48 and thereupon forwardly and downwardly in a predetermined curved path to draw the adjoining portions of the top twines through the said loops, into progressively lengthening bights 48a and to move these elongated bights chordally around the shuttles 43. For this purpose, the bottom hook bar 12 is attached, at each of the prescribed intervals, to the upper end of a curved operating lever 120 which is adapted to be actuated and controlled from a group of cams 12, 122, 123 and 124 secured upon the bottom cam shaft 16 of the machine, through a unitary assemblage of intermediate mechanism. Each of such assemblages is carried by a pair of cross beams 125 bolted upon the parallel channels 3 of the bottom section of the machine framing. For the sake of convenience, these cross beams 125 are disposed centrally within the spaces 7 provided between the two end frames 1 and 2 and the intermediate or cross frames 5. Each cross beam 125 is in the form of a webbed casting having holes therein to lighten it. The bottom cam shaft 16 is located immediately above and extends at right angles to the cross beams 125 at a location nearer to the rear ends of the latter. Of the group of rotary cams provided for each unitary assemblage two, 122 and 123, are arranged to work in the space between the cross beams of the corresponding pair, while the remaining two, 121 and 124, are disposed adjacent to, but on the exterior of, these beams. In bosses at the front of each cross beam is clamped a transverse pivot shaft 126 about the portion of which extending between the spaced beams is mounted to turn the bosses lower end of an upwardly extending comparatively short lever 127 whose upper end is forked at 127a to receive, and is pivotally connected to, a rearwardly directed extension of the relevant curved operating lever 120 attached to the bottom hook bar 12. The rear portion of the boss 127b is recessed to receive a toothed pinion segment 128 which is bolted to the boss and arranged in mesh with an oscillatory quadrant 129 (Figure 6). This gear is adjustable radially towards and away from the pinion segment 128 upon a block 130 which at its rear end is mounted for oscillation about a second pivot shaft 131 fixed transversely in the pair of cross beams 125. Provided at respectively opposite sides of the said block 130 are two curved rocking levers 132 and 133 (Figure 6) which are mounted to turn about the second pivot shaft 131. The rocking levers 132 and 133, which are rigidly connected both together and to the block 130 between them, have rearwardly directed arms 132a and 133a spaced apart in the vertical direction. The free end of the upper arm 132a is bifurcated to receive a cam follower 134 arranged in contact with the left hand cam 123 of the hereinbefore mentioned pair of rotary cams 122 and 123 working between the pair of cross beams 125, whilst the corresponding end of the lower arm 133a is similarly furnished with another cam follower 135 arranged to be acted upon by the companion right hand cam 122 of the pair. The upper and lower arms 132a and 133a of the rocking levers 132 and 133 are connected by a tension rod 136 which is not only adjustable to effect adjustment of the said arms relatively to each other to suit the cam contours, but is also adapted to take the strain to which the arms are subjected by the cams. For all practical intents and purposes the two rocking levers 132 and 133 can be regarded as together constituting a single forked lever. In any event, the construction and arrangement are such that the rotating pair of cams 122 and 123 cause oscillation of the rocking levers 132 and 133 which in turn effect oscillation of the short upwardly extending lever 127 at the front of the cross beams 125, through the medium of the quadrant gear 129 and the pinion segment 128 meshing therewith. In this way the curved hook bar operating lever 120 pivotally connected to the short upwardly extending lever 127, is moved back and forth according to knotting requirements. These oscillatory movements of each curved operating lever 120, however, require to be compounded with other appropriate movements whereby the bottom hook bar 12 will, in the result, be caused to move around the shuttles 43 in the requisite predetermined curved path. In this connection, the lower or tail end of each curved operating lever 120 is mounted upon a ball bearing carried by a bolt serving to connect it to a trunnion block 137 which is arranged for sliding movement up and down slideways 138a formed on spaced side portions of a bifurcated lever slide 138. At its upper end the lever slide 138 is more widely forked and hinged upon the ends of the front pivot shaft 126 fixed in the pair of cross beams 125. The slidable trunnion blocks 137 are retained on the slideways 138a by suitably arranged gib strips 139 secured upon the top edges of the spaced side portions of the lever slide 138. The said lever slide is adapted to be swung to and fro about the front pivot shaft 126, under the control of the two outer cams 121 and 124 of the particular group of cams concerned and through the medium of a push rod 140. At its front end, this push rod 140, which may conveniently be of tubular form, is articulated to the lever slide 138, at or near the lower end thereof. At its rear end, the said push rod is connected to an arm 141 rigidly secured to, and depending from, a rear pivot shaft 142 mounted to turn in suitable bearings in the back end of the pair of cross beams 125. The arm 141 is secured upon the rear pivot shaft 142, centrally between the ends thereof and is accordingly located between the spaced sides of the pair of cross beams 125. The opposite ends of the rear pivot shaft 142 project through the sides of the beams and have rigidly secured thereon a pair of widely spaced levers 143 and 144 which are set at 90° or approximately so to each other and are furnished with cam followers 145 and 146 (Figure 6) arranged in contact with the peripheries of the two outer cams 121 and 124. With the aforementioned exception, each of the bottom hooks 17 works in a single vertical plane coincident with the central plane of the corresponding shuttle 43.

Net guide bar

The net guide bar 147 in this constructional embodiment of the machine is disposed across the latter in a vertical plane, with its top edge located just behind and a short distance below the rear and operative edge of the guide plate 39 as illustrated in Figures 6 and 21-44.

Top twine draw-off mechanism

The practical example of the improved machine now being described also incorporates, in combination, primary draw-off means including a draw-off bar or roller 148 (see Figures 3 and 6) capable of oscillatory movement for the purpose of drawing off a sufficient length of the top twine 48 from the bobbins on the creel stand (not shown) during approximately half of each knot-forming cycle and paying out this length at the same rate as the net 149 is drawn off from the machine, a main compensating bar or roller 150 (Figures 2, 3 and 6) operable in timed relation with the bottom hooks 17 to pay out sufficient lengths of top twines 48 to enable the formed bights 48a thereof to be passed around the shuttles 43 and drawn up around the spool twines 44, an auxiliary compensating bar or roller 151 capable of fore and aft movement and operable finally to tighten the knots 49, and an intermittently rotatable net draw-off roller 152 (Figure 6), all these components being operable conjointly as hereinafter described. With the exception of the net draw-off roller which extends unbroken the full length of the machine, each of these components is made up of co-axial sections, the joints between which are spaced apart at intervals of the aforementioned prescribed distance, e. g. 36".

The top twines 48 pass forwards from the creel stand, over a fixed spacer bar 153 at the top of the machine, over a roller 154 then down through a series of individual rear trappers 155, one to every top twine, past a further spacer bar 156, under the primary draw-off bar 148 and over a guide roller 157. From thence, the top twines are passed straight forwards, over another guide roller 158, down through a series of individually front trappers 159, of which there is one to each twine, under a roller 160, back again over the main compensating bar or roller 150, then forward and around the auxiliary compensating bar or roller 151. From here, the top twines pass over a fixed spacer bar 161 which is so positioned as not only to give the auxiliary compensating bar or roller maximum effect but also to space the twines 48 laterally in groups with spaces between them so that the twines miss intermediate or cross frames 162 and the joints 150a in the main compensating bar or roller 150. Thereupon the top twines extend down in engagement with a further fixed spacer bar and guide 163 (Figure 6A) designed to space the twines uniformly at the pitch of the machine, and through the nozzles 164 in the nozzle bar 8.

The fore and aft movements of the auxiliary compensating bar or roller 151 are effected from a cam on the shaft 18 through the medium of connections 151a, 151b and 151c (Figure 6). These movements are mechanically variable to take care of the varying amounts of twine required. In this connection it will be appreciated that twines of different counts or thicknesses may be used from time to time.

The front and rear trappers 159 and 155 (shown more clearly in Figures 16 and 17) are adapted to be automatically "locked" to grip and hold the top twines 48 and "unlocked" to release the latter at required times, hereinafter to be mentioned. Whenever the front trappers 159 are locked, the rear trappers 155 are unlocked, and vice versa.

The trappers of both the front and the rear series are divided into a plurality of groups corresponding in number to the number of sections into which the machine is divided. As illustrated in Figures 16 and 17, each trapper is in the form of a slender, horizontally disposed plunger-like element which is slidable within a hollowed-out composite bar 165 constituting a housing for the same. The operative end of the trapper projects from the front of the trapper bar 169 and is beveled to a pointed wedge-like form. Each individual trapper, moreover, has a stem 166 surrounded by a compression spring 167 which is interposed between a shoulder at the back of the operative end of the trapper and a rear portion of the relevant trapper bar 165. The tail end of the stem 166 of each individual trapper projects into a channel 168 arranged at the back of but unconnected with the corresponding trapper bar 165 and is screw-threaded to receive a nut 169 constituting an abutment arranged to contact the back of the channel 168. The individual trappers 155 and 159 of each series are arranged to co-operate with a fixed angle 170 having a downwardly extending limb 170a which is recessed or notched at 170b to receive and co-operate with the operative wedge-shaped ends of the trappers. Thus, with the trappers retracted against the spring action and held clear of the angle 170, the top twines 48 can pass freely between the trappers and the angle. When, on the other hand, the trappers are locked, i. e. released and permitted to move under the spring action into engagement with the angle, 170, the twines will be trapped and held.

Now so far as the front trappers 159 are concerned, the separate trapper bars 165 are arranged in line and fixed upon any suitable supports. Beneath each such bar 165 are secured rearwardly extending brackets 171 which are forked at 171a (Figure 3) to receive the lower pivoted ends of upwardly directed trapper operating levers 172.

The upper ends of the trapper operating levers 172 are connected, by means of links 174, with the outer ends of arms 175 rigidly secured upon a torsion bar or operating shaft 176 which is adapted to be automatically rocked, to lock and unlock the front trappers 159, from and under the control of cams 177 on the bottom cam shaft 16. In this regard, the opposite ends of the torsion bar or operating shaft 176 are connected, by means of intermediate connections including bell-cranks 178, levers 179 and connecting rods 180 with cam-operated members, and these connections are so actuated automatically that the channels 168 associated with the trapper bars 165 are alternately pulled away from and released for movement back into contact with the respective trapper bars—against and under the action of the individual springs serving to control the trappers.

The rear trappers 155 are automatically operated in a somewhat similar way to the front trappers 159, but the rear trapper bars 165, one to each section of the machine, instead of being permanently fixed are so mounted as to enable them to be individually moved bodily, as occasion demands, thereby permitting a selected group of the rear trappers 155 to be readily unlocked, by means of a manually operable lever 182, in the event of it being necessary to draw an additional length of a top twine 48 from the rear creel stand to facilitate the tying in of a broken twine. The group of rear trappers 155 in each section of the machine are adapted to be automatically actuated from a cam-operated and controlled operating shaft 183 mounted at its ends in pairs of levers 184 by means of which the corresponding trapper bar assembly is carried. Each pair of levers is also manually operable as aforesaid either to lock or unlock the relevant rear trapper bar 165.

An important feature of the machine of this example is that all the twine manipulation is carried out with the top twines 48, the spool twines 44 merely passing from the spools 109, over the guide plate 39 and down to the net 149. Thus, the top twines are tied to the net at each successive row of knots 49.

*Net draw-off mechanism*

The finished net passes under the net draw-off roller 152, from thence up and over an idler roller 185, under a further roller 186 and over a final net draw-off roller 187 (Figure 6) which is driven from but at a greater peripheral speed than the said further roller with the object of keeping the net taut. The idler 185 is not mounted in bearings but is arranged loosely so as to find its own rolling centre between the main net draw-off roller 152 and the adjacent further roller 186.

From the net drawing-off roller 187, the finished net is wound onto a take-off roller 188 which is readily removable and can be taken away and replaced by an empty roller.

In order to prevent the net 149 from slipping on the main draw-off roller 152 and the idler 185, these are covered with rubber or any equivalent non-slip sheeting, while the further roller 186 and the final draw-off roller 187 are covered with felt. The take-up roller 188 is also covered with rubber or any equivalent non-slip sheeting. For the purpose of ensuring that the net is kept tensioned tightly around the main net draw-off roller 152, the roller 186 is geared to the said draw-off roller at such a ratio that the peripheral speed of the latter is slightly in excess of that of the former.

*Combined operation of top twine and net draw-off mechanisms*

To relieve the strain produced whenever the net draw-off mechanism functions to draw the top twines 48 through the machine from the back creel stand for the next "leg" of net, the operation of the associated net and top twine draw-off mechanism is briefly as follows:

The net draw-off roller 152 is stationary throughout the formation of a row of knots 49, and during this time the primary draw-off bar 148 is forced down, by appropriate actuation of suitable levers, and, since the front trappers 159 are at this stage locked, draws lengths of the top twines 48 from the creel stand; the rear trappers 155 at this stage being unlocked. Immediately before the main net draw-off roller 152 commences to revolve, the rear trappers are locked and the front trappers are unlocked. When the net draw-off roller actually commences to revolve to draw off net, the primary draw-off bar 148 is lifted and so pays out the exact amount of top twines required for making the next leg of net. In this way the load is spread over practically a full cycle.

The mechanism which performs this function and controls the leg length of the net, i. e. the distance between one row of knots and the next, may advantageously be designed to cover a leg length of from, say, ¼" (approximately 6 mm.) minimum with a machine pitch of 8 mm. to 9" (approximately 230 mm.) with a machine pitch of 18 mm.

It will be appreciated that the length of top twine used in tying a knot varies with the thickness of the thread used. Thus, the "knot length" which remains the same for a given thickness, must be added to the length of the top twine drawn from the creel stand irrespective of the leg length of the net being manufactured. For example, assume a top twine of a certain thread required a length of 1" to make a knot; then, for 1" leg length, top twine drawn off is 1"+1"=2". And for 9" leg length, the top twine drawn off is 1"+9"=10".

*Mechanism for controlling the leg length of the net*

Mechanism designed to provide such a range as this may conveniently incorporate a curved slide 189 (see Figures 4, 14 and 15) which is fulcrumed at one end at 190 and adapted to be oscillated through a fixed angle by means of cams 191 and 192 on the bottom cam shaft 16 of the machine through any suitable connections. Mounted on the curved slide 189 is a saddle 193 capable of being traversed in relation to the fulcrum point by self-locking means 194 operable by a readily accessible control handwheel H which is adapted to move a pointer over a scale HS suitably graduated in leg (knot to knot) lengths. The saddle 193 carries a boss 195 adapted for adjustment in relation to a fixed boss 196 thereon, such adjustment being effected by a remote control handwheel H¹—this time serving to move a pointer on a scale HS¹ graduated in thread thicknesses so that the machine may be preset to manufacture netting with thread of a required count or thickness. The adjustable boss 195 on the saddle 193 is so interconnected with the primary draw-off bar or roller 148, by a system of bell cranks and links 197—202 (Figures 4, 14 and 15) that whenever the curved slide makes a stroke in the appropriate direction, the said draw-off bar or roller is lowered, and vice versa. The fixed boss 196 on the saddle 193 is linked, by means of a push rod 203, to the back plate 204 of a car type brake which latter is free to oscillate about a suitable shaft and is combined with a gear wheel 205 (Figures 4 and 15) arranged in mesh both with a pinion 206 keyed to the shaft of the net draw-off roller 152 and also with a pinion 207 on the shaft of the final roller 186. The gear wheel 205 may conveniently consist of a peripherally toothed drum adapted to house the brake. The brake, which, in fact, functions as a clutch, is operable by a cam-operated lever 208, 209 and 210 and accordingly drives the associated gear wheel intermittently—ratchet fashion. The net draw-off roller 152 is fitted, at each end of the machine, with an internal expanding brake such as 211 (Figures 15 and 16) sufficiently powerful to withstand the reaction of tightening knots.

The net draw-off roller brakes 211 and the front trappers 159 are so coupled as to operate simultaneously, i. e. "on" or "off" together. The brake or clutch fitted within the gear wheel 205 operates in the opposite sense, that is to say "off" when the net draw-off roller is "on," and vice versa.

It will, therefore, be appreciated that as the saddle 193 is traversed towards the fulcrum 190 of the curved slide 189, the net mesh and the top twine draw-off is decreased. For example, in the event of it being required to change the mesh from 9" leg to ½" leg, using the same thickness of yarn, the saddle would be traversed by the handwheel H to a point fairly close to the fulcrum 190 of the curved slide, leaving the relationship of the adjustable and the fixed bosses 195 and 196 on the saddle the same because the same length of twine is used in the knot itself. For finer yarns, however, the adjustable boss 195 would be set nearer to the fixed boss 196.

For starting and stopping and varying the speed of the machine, at will, there may be provided a hydraulic mechanism which is designated generally by the letter M and controllable by any one of a plurality of push buttons 212 spaced apart at the aforementioned intervals and made readily accessible at the front of the machine (see Figure 1). Of the push buttons in each panel 212 there is, as shown in Figure 2, a start button B, a stop button $B^1$, a "fast" button $B^2$, a "slow" button $B^3$ and an "inch" button $B^4$. In addition, there is provided a panel $212^1$ in which are mounted start and stop buttons $B^5$ and $B^6$ for the hydraulic motor.

The main drive of the machine may, alternatively, be controlled either mechanically, electrically, electro-hydraulically, electronically or in any other appropriate and convenient manner.

As much as possible of the complete machine is covered in by suitably designed covers and casings such as those indicated at C, $C^1$, $C^2$ and $C^3$ in Figure 1.

*Operation of machine*

A complete cycle of operation of the machine to form a row of knots 49 will now be described with reference to Figures 21–44. It will be assumed that, initially, one row of knots 49 has just been completed and that the front pins 67, now horizontal, have been moved fully back to effect their disengagement from these knots (see Figure 43). At this stage, the guide nozzles 164 for the top twines 48 besides being fully forward and turned down into their lowest positions immediately above the knots are offset laterally (to left or right) with respect to the median vertical planes of the shuttles 43 to the extent of a quarter pitch. As will be recalled, a full "pitch" P (Figure 18) is the distance between the median vertical planes of any two adjacent shuttles. The front pins 67 at this stage are in alignment with the knots 49 of the completed row, and, like the nozzles 164, are offset laterally a quarter pitch to the appropriate side of the aforesaid median vertical planes of the shuttles. The rear pins 79 are in their rearmost positions—with their central axes coincident with the median vertical planes of the shuttles. The top hooks 103 are at this initial stage fully raised and forward, and the tightened knots are resting against the rear edge 39a of the guide plate 39, with the netting 149 extending down in front of the net guide bar 147; the bottom hooks 17 at this stage are slowly rising from beneath the shuttles.

Figure 21:
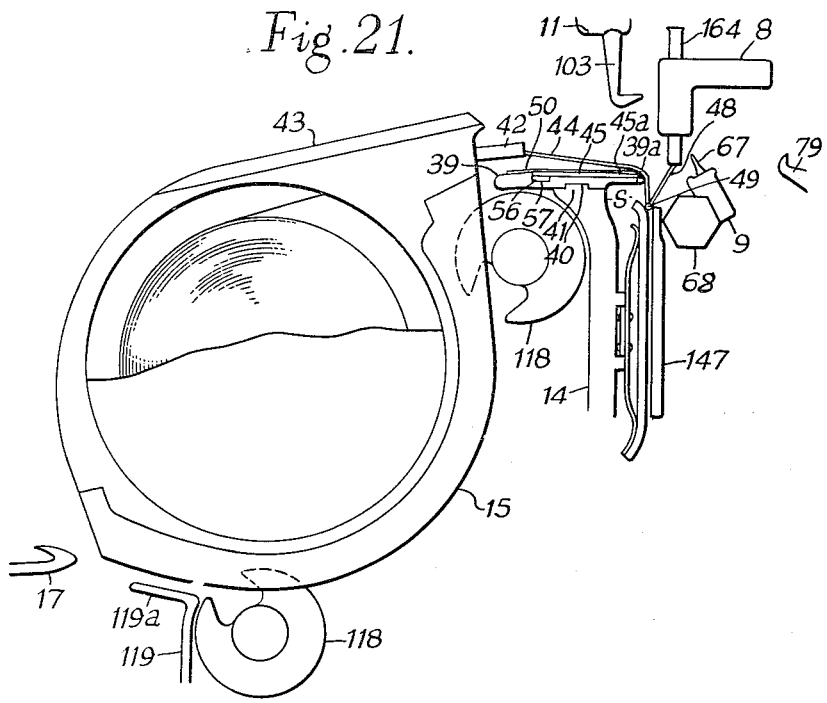
Figure 22:
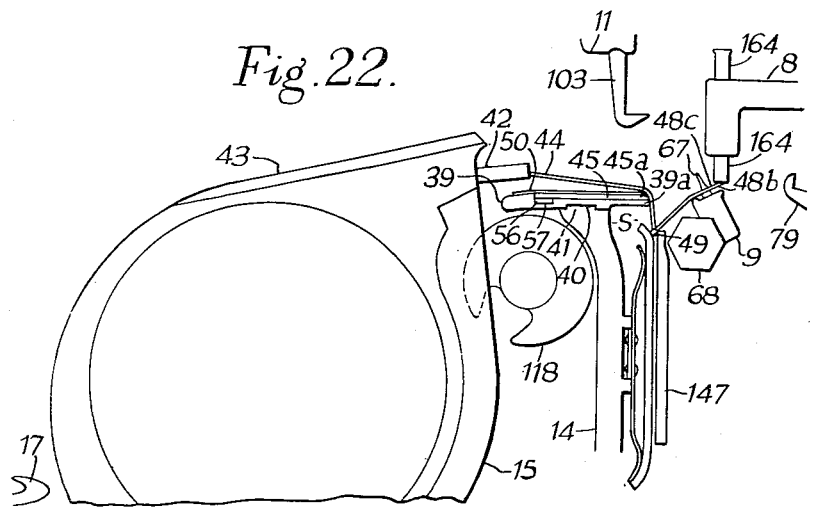
Figure 33:
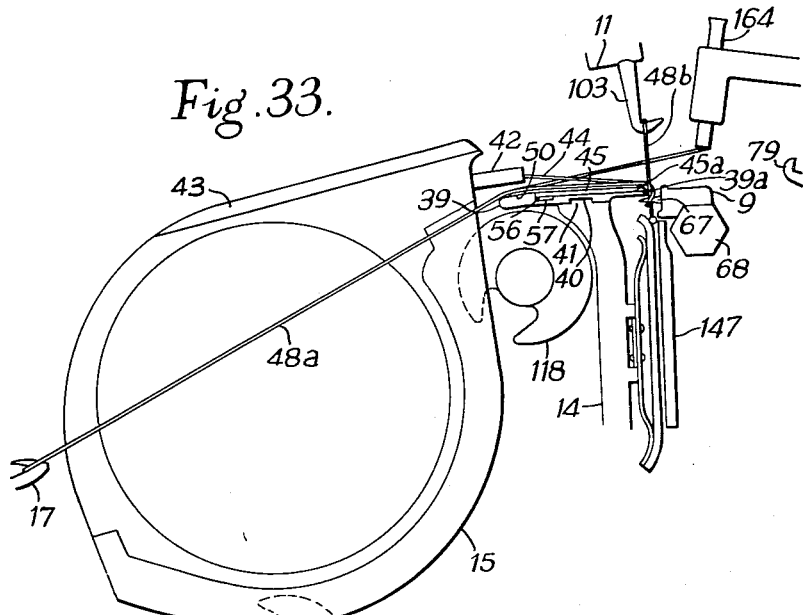
Figure 34:
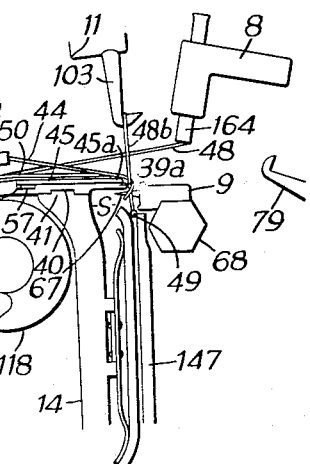
Figure 37:
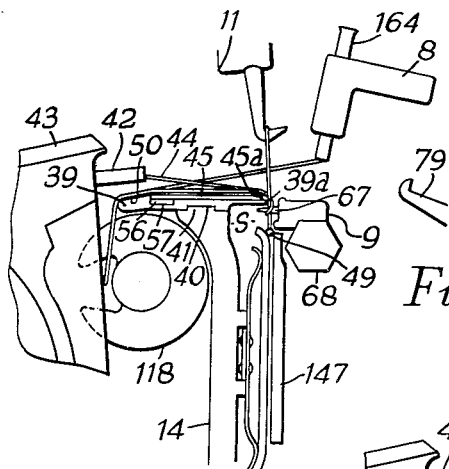
Figure 38:
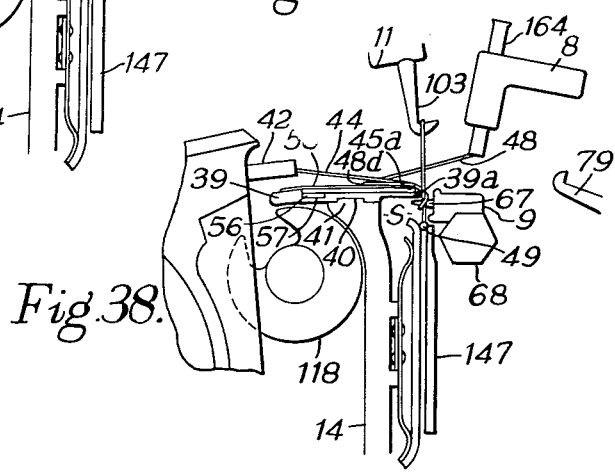
Figure 39:
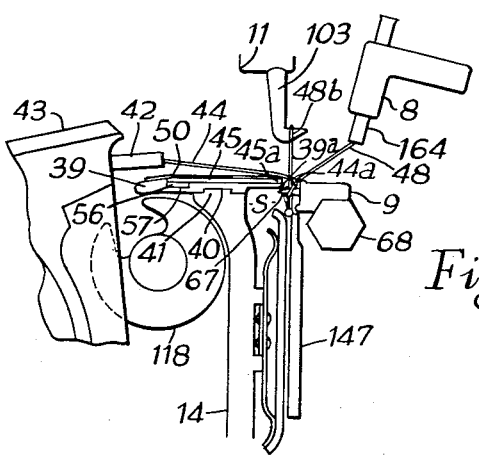

As depicted in Figure 44, the cycle commences by the netting 149 being drawn off in a downward direction to an extent depending on the length of leg being made. Simultaneously with this downward movement of the netting, the primary draw-off means function to pay-out predetermined lengths of the top twines 48. During the downward movement of the netting, moreover, the guide nozzles 164 are swung upwards to their maximum height to provide space in which, if necessary, spool twines can be replenished or broken twines can be tied in. As the netting is drawn off to the extent required, the guide nozzles 164 are, as shown in Figure 21, returned to their lowest positions a little to the rear of the knots 49 and commence to move laterally in the appropriate direction to positions midway between the shuttles, while the front pin bar 9, in addition to being moved fully forwards and turned up so that the front pins 67 are only slightly inclined forwards from the vertical, is also shifted laterally to position the said pins in line with the rear pins 79, that is to say with their axes coincident with the median vertical planes of the shuttles. While this is happening, the spool twine draw-off bar 45 is projected to engage and draw-off the spool twines to the extent desired. With the positions of the front and rear pins unchanged, the nozzles complete their lateral movement to the extent of a quarter pitch to positions midway between the shuttles and start to move rearwardly (Figure 22) each to place a single length 48c of twine 48 alongside the corresponding front pin 67. At this stage the front pin bar 9 is shifted endwise to move the front pins 67 over laterally to the extent of one pitch P (Figure 18) and, by the time the nozzles 164 have moved fully back to draw the single length 48c of the top twines alongside and slightly beyond the rear pins 79 (Figure 23) the rear pin bar 10 commences to move endwise in the same direction as the front pin bar 9. The top twine guide nozzles 164 are now moved forwards again (see Figure 24) to normal positions just in advance of the front pins 67 and at the commencement of this forward movement, the rear pins 79 complete their lateral movement to the extent of one pitch so that they are once again in line with the front pins (but this time offset one pitch P with respect to the median vertical planes of the shuttles). During the forward movement of the nozzles 164, however, both the rear pins 79 and the front pins 67 move laterally in the opposite direction towards their previous positions coincident with the median vertical planes of the shuttles; in fact, at the temination of the said forward movement of the nozzles, the rear pins have moved fully over to these positions, while the front pins have moved over in the same direction but only to the extent of half a pitch. Still disposed, laterally, at positions midway between the shuttles, the nozzles 164 commence to move rearwardly again as illustrated in Figure 25 and at this point in the cycle the front pins 67 complete their lateral movement into line with the rear pins 79 so that the top twines 48 are pulled around the front pins, thereby completing the formation of the loops 48b of the top twines 48 about the front and rear pins. These loops 48b are initially in a horizontal or substantially horizontal plane (see Figure 25). At this phase of the cycle, the front pin bar 9 is still fully turned up and right forward, and the rear pin bar 10 is in its rearmost position. The nozzles, in moving rearwardly as last described, are (as shown in Figure 26) also lifted so as to draw straight upwardly inclined portions 48d of the top twines immediately adjoining the formed loops 48b. While this is happening, the top hook bar 11 is so operated that the top hooks 103 are swung downwards and rearwardly in curved paths L to penetrate the horizontally disposed loops 48b of the top twines, and the rear pins 79 are moved over laterally to the extent of half a pitch in a direction away from the top twines 48. By this time the spool twine draw off bar 45 has been fully retracted. The top hooks 103 now move straight back a short distance Y; the front pin bar 9 swings down (see Figure 27) about its axis and simultaneously moves back slightly, then laterally a quarter pitch to enable the front pins 67 to penetrate exactly between the spool twines 44, and then forward again so that in the result the front pins are once again disposed horizontally and, after moving to avoid the guide plate 39, become located with their points immediately beneath the rear edge 39a of the said plate; thereafter, the front pins move laterally a quarter pitch back into the median vertical planes of the shuttles. The rear pin bar 10 moves forward as shown in Figure 29 so that the rear pins 79 follow up the front pins 67 and so prevent elongation and distortion of the loops 48b of the top twines, and the top hooks commence to move forwardly in curved paths L¹ (Figure 26) so that they take the said loops, previously penetrated thereby, off the rear pins. Next, with the empty rear pins commencing to move backwards, the top hooks continue their compound upward and forward movement to displace the loops 48b and eventually dispose them vertically or substantially so. This displacement of the loops 48b is, as previously explained, for the purpose of disposing them more favourably for subsequent penetration by the bottom hooks 17 as shown in Figure 29. At the same time, the nozzles 164, still maintained laterally in positions midway between the shuttles, are not only raised to their maximum heights but also forward somewhat such as to incline the single lengths 48d of the top twines adjoining the loops 48b not far to the rear of the latter (Figure 29). By the time these loops 48b have assumed their vertical disposition, the bottom hooks have, in moving rearwards, already penetrated them. Continuing such movement, the bottom hooks 17 become located alongside the inclined single lengths 48d of the top twines with their hooked extremities to the rear of the same as depicted in Figure 30. At this stage, the nozzles 164 move laterally over the tops of the shanks of the bottom hooks 17 to the extent of approximately twice (say 1.80 times) the pitch of the machine (see Figure 18). By this movement the inclined single lengths 48d of the top twines are laterally deflected and pulled into contact with the said shanks. The rear pins 79 continue to move back idly, and the bottom hooks 17, in now commencing to move forwards as shown in Figure 31, engage, form into bights 48a (Figure 32) and draw through the vertically disposed loops 48b of the top twines the adjoining and laterally deflected single lengths 48d of the latter. The nozzles then move back again laterally to the extent of, say, 1.5 of a pitch P, and the bottom hooks 17 continues to move both forwards and downwards around the curved fronts of the shuttles, thereby elongating the bights 48a of the top twines and drawing these chordally about the shuttles (Figure 33). The portions of the elongated bights 48a immediately adjoining and extending forwardly in front of the vertical loops 48b of the top twines 48 are accordingly pulled down into contact with the upper surface of the guide plate 39. The nozzles 164, in addition to being moved laterally to bring their axes into coincidence with the median vertical planes of the shuttles, also move downwards towards the knot-forming location. By the time the bights 48a have been drawn right around the fronts of the shuttles 43 and are beginning to pass rearwardly beneath the undersides of the shuttle holders 15, they are, (as illustrated in Figure 34), brought into contact with the stripper bar 119 as a consequence of which the bights are released from the bottom hooks 17. At this phase in the knot-forming cycle, the main compensating bar or roller 150 functions to pull back the top twines 48 with the result that the bights 48a just released from the bottom hooks 17 (Figure 35) are drawn up towards the spool twines 44, being guided by the rounded undersides of the shuttle holders 15. It is convenient here to mention that the bottom hooks remain quiescent beneath the forwardly directed portion or flange 119a of the stripper bar 119 until the end or nearly the end of the complete cycle whereupon they are swung up into their starting positions in readiness for the next cycle. As they are drawn up around the shuttle holders 15, the elongated bights 48a become progressively shorter, and to allow them to pass by the recessed anchor plates 118 for the said holders, these plates are appropriately oscillated (see Figures 36 and 37). The rapidly shortening bights 48a now pass rearwardly over the guide plate 39 and engage the spool twines 44 (Figure 18) as a consequence of which loops 44a of the latter (Figure 39) are pulled back through the vertical loops 48b of the top twines 48, sufficient lengths of the spool twines having been provided for this purpose by actuation of the spool twine draw bar 45. At this moment, movement of the main compensating bar or roller 150 ceases. The top hooks 103 now move down (Figure 40) in the path L² (Figure 26) towards the knots 49 and are then withdrawn from the latter in a forward direction (Figure 41). To complete the cycle, the nozzles 164 move right down to positions immediately above the knots (Figure 42) and the top twines 48 are again tensioned but this time by appropriate movement of the auxiliary compensating bar or roller 151 to tighten the knots 49. In this connection, the portions of the top twines forming the vertical loops 48b are drawn back by the said auxiliary compensating bar or roller. Thereupon, the withdrawn top hooks 103 are moved straight up in paths L³ (Figure 26) to their original starting positions.

During the hereinbefore described knot-forming cycle, the bottom and top cam shafts 16 and 18 are caused to rotate through one complete revolution.

In the specific example herein described each nozzle 164 is movable to lay around the corresponding front and rear pins 67 and 79 a single loop 48b of the relevant top twine 48. If desired, however, the operating cams in the machine may be so modified as to cause each of the said nozzles to lay around the appropriate front and rear pins two loops of the relevant top twine, the purpose being to form a double knot.

Again, by providing two sets of cams for use alternatively, the machine may be adapted to produce netting having either single or double knots.

We claim:

1. In a power-operated net making machine equipped with a row of stationary shuttles for containing spools from which spool twines are drawn, a structure for supporting supplies of top twines, and means operable to form loops of the top twines, a knotting mechanism comprising, in combination, means for engaging, forming into bights and drawing through the said loops adjoining portions of the top twines, said means being movable to cause substantial elongation of the bights and dispose the same beneath the spools and about the spool twines, means for taking the loops formed from the top twines and moving them into such positions as to facilitate their penetration by the first mentioned means for engaging and forming into bights the adjoining portions of the said twines, a primary draw-off mechanism for drawing the top twines off the supplies, a compensating member around which the top twines pass, and means for moving the said member to and fro in directions towards and away from the knotting mechanism whereby not only are lengths of the top twines paid out to the first mentioned means while these are moving about the spools, but the bights are drawn up and engaged with the relevant spool twines in such a way as to draw loops of the latter through the loops of the top twines and thereby produce a row of knots.

2. A combination according to claim 1, wherein there is provided, in conjunction with the compensating member which is movable fore and aft for finally tightening the knots, a movable auxiliary compensating member.

3. In a power-operated net making machine equipped with a row of shuttles for containing spools from which spool twines are drawn and a structure for supporting supplies of top twines, a knotting mechanism comprising, in combination, movable guides through which the top twines from the supplies are drawn and from which these twines extend to the net being produced, means for moving the said guides back and forth, a fixed part functioning as a support both for the portions of the spool twines extending from the spools to the net and for each succeeding row of knots during formation thereof, two suitably spaced and relatively movable sets of elements, means for effecting relative lateral movements between the said elements and the guides conjointly with the movements of the latter back and forth whereby the top twines are drawn into loops about the said elements, hooked members operable not only to engage the said loops and take them off the set of elements furthest away from the fixed part but also to displace the loops into a plane more favourable for a knot-tying operation than that in which they are initially formed, a second series of hooked members operable first to penetrate the displaced loops and then to engage adjoining portions of the top twines, form the same into bights and draw the latter through the aforesaid loops and about the spools, means for stripping the bights from the second mentioned hooked members, and means for drawing up the stripped bights and effecting engagement thereof with the portions of the spool twines supported by the aforesaid fixed part whereby loops of the spool twines are drawn through the loops of the top twines.

4. A knotting mechanism according to claim 3, wherein the guides are movable laterally with respect to the second mentioned hooked members, to left and right alternately during the formation of successive rows of knots.

5. A knotting mechanism according to claim 3, wherein the guides are in the form of nozzles which are secured in a bar at the pitch of the net making machine.

6. A knotting mechanism according to claim 5, wherein the bar in which the nozzles are secured, besides being capable of rising and falling, is movable to and fro and also laterally to the left and to the right alternately during the formation of successive rows of knots.

7. In a power-operated net making machine equipped with a row of shuttles for containing spools from which spool twines are drawn and a structure for supporting supplies of top twines, a knotting mechanism comprising, in combination, movable guides through which the top twines from the supplies are drawn and from which these twines extend to the net being produced, means for moving the said guides back and forth, a fixed part functioning as a support both for the portions of the spool twines extending from the spools to the net and for each succeeding row of knots during formation thereof, a row of front pins, a bar located behind the fixed part and in which the said front pins are mounted, said bar, besides being mounted to turn about an axis and movable back and forth, being also adapted to be shifted laterally alternately to the left and to the right during the formation of successive rows of knots, a row of rear pins located behind and parallel to the front pins, a further bar in which said rear pins are mounted, this further bar being movable back and forth and also laterally in a similar way to the front pin bar, the top twines being drawn into loops about the front and rear pins as a consequence of the back and forth movements of the guides conjointly with the lateral movements of the said pins, hooked members operable not only to engage the said loops and take them off the row of rear pins but also to displace the loops into a plane more favourable for a knot-typing operation than that in which they are initially formed, a second series of hooked members operable first to penetrate the displaced loops and then to engage adjoining portions of the top twines, form the same into bights and draw the latter through the aforesaid loops and about the spools, means for stripping the bights from the second mentioned hooked members, and means for drawing up the stripped bights and effecting engagement thereof with the portions of the spool twines supported by the aforesaid fixed part whereby loops of the spool twines are drawn through the loops of the top twines.

8. A knotting mechanism according to claim 7, wherein the hooked members operable to take loops of the top twines off the rear pins and dispose these loops in a plane more favourable for a knot tying operation are initially located and operable above the fixed part.

9. A knotting mechanism according to claim 7, wherein the first mentioned hooked members are arranged to work together as a set in planes permanently coincident with the central planes of the spools, each such member when operating being caused to follow a prescribed path in the relevant plane, and this path being such that, during each knot-forming cycle, the member is moved first downwards in a curved line to penetrate the appropriate loop, and, after engaging and receiving this loop, upwards and forwards again to place the loop in a more favourable position for penetration by the appropriate one of the second mentioned hooked members, then downwards again as the loop held thereby is drawn up to the knot, next forwards towards the front of the machine so that the member is withdrawn from the drawn-up loop and finally upwards to its original starting position.

10. A knotting mechanism according to claim 7, wherein the second mentioned hooked members, after penetrating the loops, and forming and drawing through these loops bights of the adjoining portions of the top twines, are caused to move down below the fixed part in paths conforming with the shape of the fronts of the shuttles.

11. A knotting mechanism according to claim 10, wherein each of the second mentioned hooked members primarily works in a single plane coincident with the central vertical plane of the relevant spool, but is movable laterally to enable the bight of the relevant top twine to pass over the shuttles.

12. In a power-operated net making machine equipped with a row of stationary shuttles for containing spools from which spool twines are drawn, a structure for supporting supplies of top twines, and means operable to form loops of the top twines, a knotting mechanism comprising, in combination, means for engaging, forming into bights and drawing through the said loops adjoining portions of the top twines, said means being movable to cause substantial elongation of the bights and dispose the same beneath the spools and about the spool twines, means for taking the loops formed from the top twines and moving them into such positions as to facilitate their penetration by the first mentioned means for engaging and forming into bights the adjoining portions of the said twines, a primary draw-off mechanism including a bar for drawing the top twines off the supplies, a main compensating member around which the top twines pass, means for moving the said member to and fro in directions towards and away from the knotting mechanism whereby not only are lengths of the top twines paid out to the first mentioned means while these are moving about the spools, but the bights are drawn up and engaged with the relevant spool twines in such a way as to draw loops of the latter through the loops of the top twines, an auxiliary compensating member which is adjustable to take care of varying twine thicknesses, a series of individual rear trappers, a series of individual front trappers, the top twines passing through the rear trappers, under the primary draw-off bar, through the front trappers, over the main compensating member and around the auxiliary compensating member, and means for automatically locking and unlocking the front and rear trappers to hold and release the top twines at required times.

References Cited in the file of this patent
UNITED STATES PATENTS

| | | |
|---|---|---|
| 560,560 | Woschyllo | May 19, 1896 |
| 664,433 | Rendall et al. | Dec. 25, 1900 |
| 948,386 | Zang | Feb. 8, 1910 |
| 2,219,015 | Nishiguchi | Oct. 22, 1940 |
| 2,518,140 | Heggland | Aug. 8, 1950 |